(12) United States Patent
Williams et al.

(10) Patent No.: US 7,870,019 B2
(45) Date of Patent: Jan. 11, 2011

(54) METHOD AND SYSTEM FOR PROVIDING PROMOTIONS TO A CUSTOMER BASED ON THE STATUS OF PREVIOUS PROMOTIONS

(75) Inventors: Eric N. Williams, Tampa, FL (US); J. Michael Erickson, Cincinnati, OH (US); Kellie Katherine Dolan, Tampa, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1495 days.

(21) Appl. No.: 11/138,412

(22) Filed: May 27, 2005

(65) Prior Publication Data

US 2005/0216347 A1 Sep. 29, 2005

Related U.S. Application Data

(62) Division of application No. 09/826,814, filed on Apr. 6, 2001, now Pat. No. 7,415,426.

(51) Int. Cl.
*G06Q 30/00* (2006.01)
(52) U.S. Cl. ................. 705/14.13; 705/14.1; 705/14.25; 705/14.41
(58) Field of Classification Search ................. 705/14.1, 705/14.13, 14.25, 14.41
See application file for complete search history.

(56) References Cited

U.S. PATENT DOCUMENTS

| | | | |
|---|---|---|---|
| 4,567,359 | A | 1/1986 | Lockwood |
| 4,750,119 | A | 6/1988 | Cohen et al. |
| 5,025,372 | A | 6/1991 | Burton et al. |
| 5,173,851 | A | 12/1992 | Off et al. |

(Continued)

FOREIGN PATENT DOCUMENTS

JP   H11-175851   7/1999

(Continued)

OTHER PUBLICATIONS

Dec. 13, 1998 "SAS Institute Name Ceres to CRM Partnership Program" Business Wire.

(Continued)

*Primary Examiner*—Raquel Alvarez
(74) *Attorney, Agent, or Firm*—Neifeld IP Law, PC

(57) ABSTRACT

A system, computer program product and method including delivering an initial promotion to a customer, determining a status of the initial promotion delivered, selecting a related promotion based on the status of the initial promotion determined, and delivering the related promotion to the customer. The related promotion is selected based on the status of the initial promotion determined by selecting a predetermined related promotion associated with the status of the initial promotion determined. Moreover, the initial and related promotions may be delivered through an electronic or hard delivery medium, and the status of the initial promotion delivered may be determined by determining a status of the initial promotion based on electronic feedback from the customer or based on predetermined status criteria assigned to the initial promotion. Promotions may be delivered primarily through an effective delivery medium for a particular customer which is determined by applying a predetermined effectiveness criteria which includes one of determining the number of occurrences of a predetermined status within a delivery medium and determining the frequency of the customer's use of the delivery medium.

34 Claims, 11 Drawing Sheets

U.S. PATENT DOCUMENTS

| | | | |
|---|---|---|---|
| 5,237,157 A | 8/1993 | Kaplan | |
| 5,256,863 A | 10/1993 | Ferguson et al. | |
| 5,576,951 A | 11/1996 | Lockwood | |
| 5,687,322 A | 11/1997 | Deaton et al. | |
| 5,761,648 A | 6/1998 | Golden et al. | |
| 5,765,142 A | 6/1998 | Allred et al. | |
| 5,781,909 A | 7/1998 | Logan et al. | |
| 5,822,735 A | 10/1998 | De Lapa et al. | |
| 5,873,071 A | 2/1999 | Ferstenberg et al. | |
| 5,930,764 A | 7/1999 | Melchione et al. | |
| 5,974,399 A | 10/1999 | Giuliani et al. | |
| 6,044,357 A | 3/2000 | Garg | |
| 6,055,573 A | 4/2000 | Gardenswartz et al. | |
| 6,061,660 A | 5/2000 | Eggleston et al. | |
| 6,070,147 A | 5/2000 | Harms et al. | |
| 6,073,112 A | 6/2000 | Geerlings | |
| 6,076,068 A | 6/2000 | De Lapa et al. | |
| 6,078,893 A | 6/2000 | Ouimet et al. | |
| 6,092,725 A | 7/2000 | Swartz et al. | |
| 6,112,988 A | 9/2000 | Powell | |
| 6,119,099 A | 9/2000 | Walker et al. | |
| 6,119,104 A | 9/2000 | Brumbelow et al. | |
| 6,144,944 A * | 11/2000 | Kurtzman et al. | 705/14 |
| 6,334,100 B1 | 12/2001 | Walter | |
| 6,336,099 B1 | 1/2002 | Barnett et al. | |
| 6,848,995 B1 | 2/2005 | Walker et al. | |
| 7,415,426 B2 | 8/2008 | Williams | |
| 2001/0014868 A1 | 8/2001 | Herz et al. | |
| 2002/0026348 A1 | 2/2002 | Fowler et al. | |
| 2002/0026356 A1 * | 2/2002 | Bergh et al. | 705/14 |
| 2002/0123926 A1 | 9/2002 | Bushold | |
| 2008/0208676 A1 | 8/2008 | Williams | |

FOREIGN PATENT DOCUMENTS

| | | |
|---|---|---|
| JP | H11-219481 | 8/1999 |

OTHER PUBLICATIONS

"SAS Institute names Ceres to CRM Partnership Program" Business Wire, Dec. 13, 1998.

"Qualitative Marketing Software—QMSoft—Announces Centrus Customer Service Interaction Objects" Business Wire, Apr. 20, 1999.

International Search Report for PCT/US02/09320, International Filing Date Mar. 27, 2002. Priority Date Apr. 6, 2001.

Jun. 12, 2001 Ex parte Clement W. Bowman, *BPAI*, 2001, Pat. App. LEXIS 46, Jun. 12, 2001, Decided.

Apr. 20, 2004 Ex parte Carl A. Lundgren, BPAI Appeal No. 2003/2088, U.S. Appl. No. 08/093,516, Heard Apr. 20, 2004.

Claims filed by amendment Dec. 24, 2009 in U.S. Appl. No. 11/138,412.

* cited by examiner

| CID (203) | PROMOTION (205) | DELIVERY DATE (207) | DELIVERY MEDIUM (209) | PROMOTION STATUS (211) |
|---|---|---|---|---|
| 052799 | ADV2787 | 11/02/00 | CUST. COMP | REJECT (H) |
|  | PI2787 | 11/02/00 | CUST.COMP. | ACCEPT |
| 090269 | ADV8711 | 10/10/00 | DIRECT MAIL | REJECT (H) |
|  | PI8711 | 10/26/00 | CUST. COMP | ACCEPT (H) |
|  | PI7858 | 10/30/00 | ELECT TRANS. | REJECT (H) |
|  | PI7859 | 11/03/00 | KIOSK | ACCEPT (H) |
|  | PI8200 | 11/03/00 | POS | UNKNOWN |

FIG.2A

| PROMOTION IDENTIFIER (215) | PROMOTION STATUS (217) | RELATED PROMOTION (219) |
|---|---|---|
| ADV8711 | ACCEPT | 10 CENTS OFF BRAND X SWEETENER |
|  | REJECT | 25 CENTS OFF BRAND X SWEETENER 10 |
| PI8711 | ACCEPT | 30 CENTS OFF BRAND B COFFEE |
|  | REJECT | 50 CENTS OFF BRAND X SWEETENER |
| PI7858 | ACCEPT | BRAND B COFFEE, IT TASTES GOOD |
|  | REJECT | 60 CENTSOFF BRAND B COFFEE |
| PI2787 | ACCEPT | AD3535; PI6742; PI7474 |
|  | REJECT | PI7188; PI7227 |
| ADV2787 | ACCEPT | ADV 3900 |
|  | REJECT | PI2787 |

FIG.2B

METHOD AND SYSTEM FOR PROVIDING PROMOTIONS TO A CUSTOMER BASED ON THE STATUS OF PREVIOUS PROMOTIONS

This application is a divisional of application Ser. No.09/826,814 filed Apr. 6, 2001 now U.S. Pat. No. 7,415,426.

The disclosure of application Ser. No.09/826,814 filed Apr. 6, 2001 is incorporated herein by reference.

BACKGROUND OF THE INVENTION

1. Field of the Invention

The present invention relates generally to a method and system for providing promotions to customers, and more specifically to a method and system for providing a promotion to a customer based on the status of a promotion previously delivered to the customer. As used herein, the term "promotion" refers to any promotion, advertisement, incentive; coupon, commercial, or communication for promoting one or more goods and/or services.

2. Discussion of the Background

It is well known that manufacturers and retailers expend a significant amount of resources distributing promotions in an attempt to entice consumers to purchase a particular product. Due to the variety of consumers in the marketplace today, it is inevitable that different consumers will be enticed in different ways by a promotion. For example, some consumers may be persuaded to purchase a product based on creative advertising for the product, while others are enticed solely by the dollar amount of a purchase incentive for the product. While currently known promotional strategies distribute targeted promotions to customers based on the product purchase history of the customer, the present inventors have recognized that the effectiveness of such promotional programs is determined collectively based on the overall sales for a particular product or retail store without regard to the effectiveness of a particular promotion delivered to a particular customer. The present inventors have also determined that promotional programs of this type lead to distribution of promotions to customers who are not likely to be enticed by the promotion resulting in ineffective and wasted promotional efforts.

In addition, it is known that manufacturers and retailers distribute promotions for their products through a variety of distribution mediums such as the postal service, newspapers or magazines, printing from a point of sale terminal at a checkout counter in a grocery store, and, most recently, the Internet. The present inventors have recognized, however, that customers are primarily exposed to promotional efforts through a small number of mediums accessible and/or preferable to the individual customer, and that current promotional programs attempt to deliver promotions to individual customers without regard to the medium preferable to the customer. These promotional programs also lead to ineffective and wasted promotional efforts.

SUMMARY OF THE INVENTION

Accordingly, the object of the present invention is to provide a method, system and computer program product for solving the above-noted problems.

This and other objects are achieved by providing a novel method, system, and computer program product providing promotions to a customer based on the status of promotions previously delivered to the customer.

In a first embodiment of the present invention, the method on which the system and computer program product are based includes delivering an initial promotion to a customer, determining a status of the initial promotion delivered, selecting a related promotion based on the status of the initial promotion determined, and delivering the related promotion to the customer. According to one aspect of this embodiment, the initial and related promotions may be delivered through an electronic or hard delivery medium. According to another aspect of this embodiment, the status of the initial promotion delivered may be determined by determining a status of the initial promotion based on electronic feedback from the customer or based on predetermined status criteria assigned to the initial promotion. Where status criteria is used, the status is determined based on purchase information of the product promoted by the initial promotion or redeeming information, delivery date information, or an expiration date of the initial promotion.

In another aspect of the first embodiment of the present invention, the related promotion is selected based on the status of the initial promotion determined by selecting a predetermined related promotion associated with the status of the initial promotion determined. Moreover, the delivering of an initial promotion, determining a status of the initial promotion, selecting a related promotion and delivering the related promotion may be performed through a single medium in a single transaction with the customer, or alternatively through at least two transactions with the customer. Where at least two transactions are used, a single delivery medium or at least two delivery mediums may be used to perform the at least two transactions.

In a second embodiment of the present invention, the method on which the system and computer program product are based includes delivering a plurality of promotions to a customer through a plurality of delivery mediums, determining a status of each promotion delivered, determining an effective medium for the customer based on the status of each promotion delivered, and delivering promotions to the customer primarily through the effective medium determined. According to one aspect of the second embodiment of the present invention, the plurality of promotions may be delivered through an electronic or hard delivery medium. According to another aspect of this embodiment, the status of the plurality of promotions delivered may be determined based on electronic feedback from the customer or based on predetermined status criteria assigned to each promotion. Where status criteria is used, the status is determined based on purchase information of the product promoted by the initial promotion or redeeming information, delivery date information, or an expiration date of the promotion.

In another aspect of the second embodiment, an effective medium is determined for the customer based on the status of each promotion delivered by determining whether a delivery medium meets a predetermined effectiveness criteria. The predetermined effectiveness criteria may be based on the number of occurrences of a predetermined status within a delivery medium or the frequency of the customer's use of the delivery medium.

In yet another embodiment of the present invention, the method on which the system and computer program product are based includes delivering an initial promotion to a customer, determining a status of the initial promotion delivered by monitoring customer transactions at a point of sale (POS), selecting a related promotion based on the status of the initial promotion determined, and delivering the related promotion to the customer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a promotions tracking table for associating a customer identifier (CID) with the promotion identifier, delivery date, delivery medium, and status of each promotion delivered to the customer associated with the CID in accordance with the present invention;

FIG. 2B is a related promotions table for associating a promotion identifier with the possible statuses of the promotion as well as related promotions corresponding to each status in accordance with the present invention;

DESCRIPTION OF THE PREFERRED EMBODIMENTS

Figure 1:
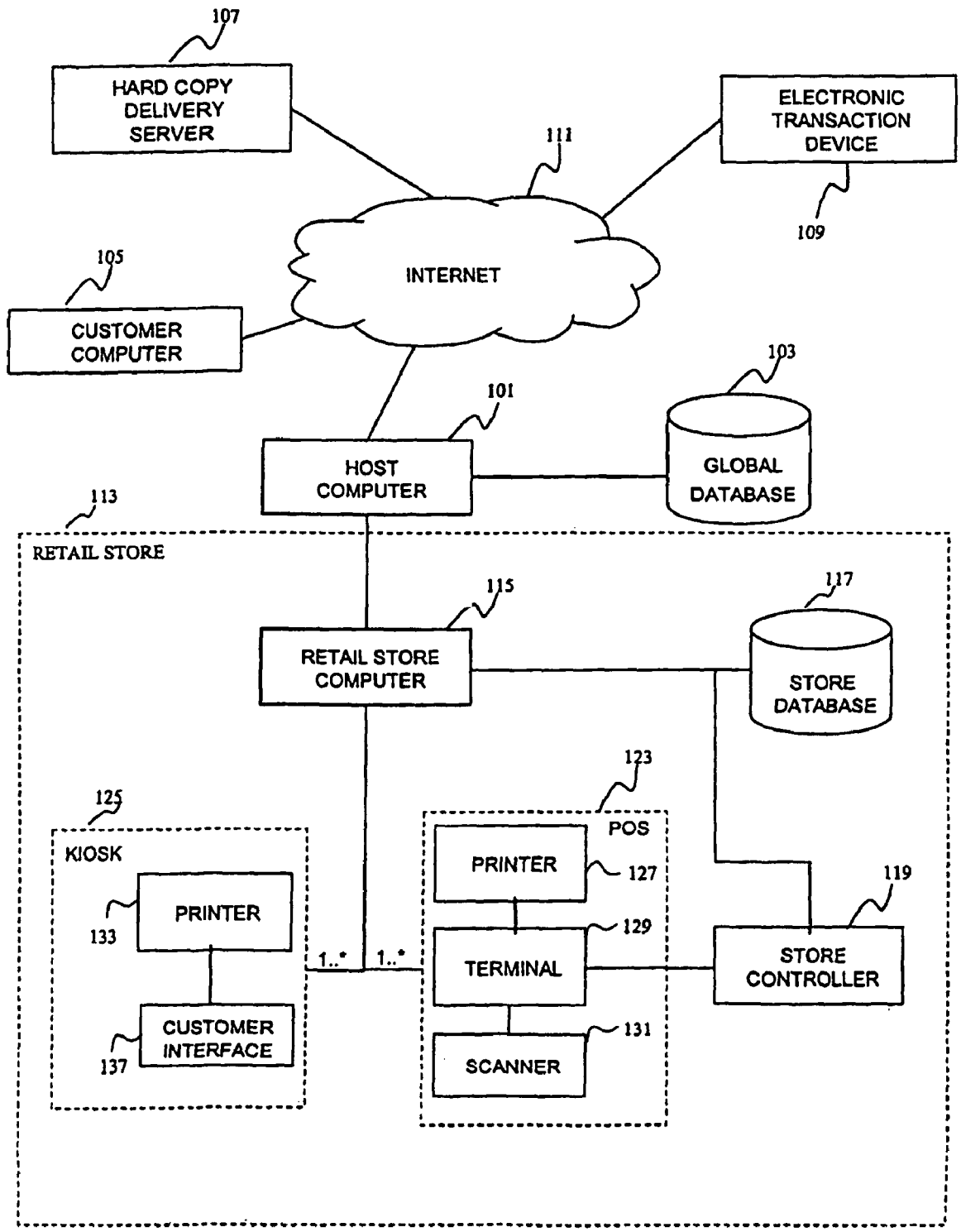
FIG. 1 is a system for providing promotions to a customer based on the status of promotions previously delivered to the customer in accordance with an embodiment of the present invention.

Referring now to the drawings, and more particularly to FIG. 1 thereof, there is shown a system for providing promotions to a customer based on the status of promotions previously delivered to the customer in accordance with an embodiment of the present invention. The system of FIG. 1 includes a host computer 101, a global database 103, a customer computer 105, a hard copy delivery server 107, an electronic transaction device 109, and a wide area network (WAN) such as the Internet 111. Associated with the host computer is at least one retail store 113 which includes a retail store computer 115, a store database 117, a store controller 119, one or more points of sale (POS) 123, and one or more kiosks 125. Each POS 123 includes a POS printer 127, a terminal 129, and a scanner 131, while each kiosk 125 includes a kiosk printer 133, and a customer interface 137.

Figure 10:
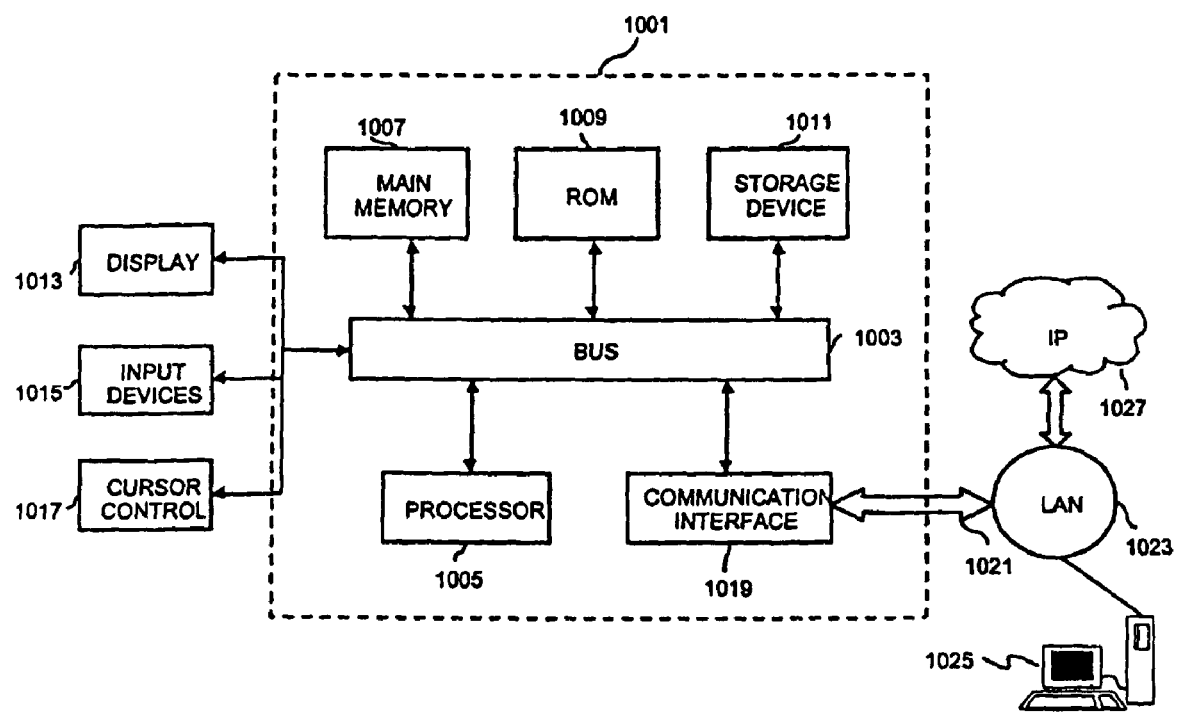
FIG. 10 is a schematic illustration of a computer system programmed to perform one or more of the special purpose functions of the present invention.

The host computer 101 is any suitable workstation, server, or other device, such as the computer system 1001 of FIG. 10, for communicating with the customer computer 105, the hard copy delivery server 107, the electronic transaction device 109 and the retail store computer 115, and for storing information in and retrieving information from the global database 103. The host computer 101 delivers initial promotions to customers, determines the status of the initial promotions delivered, and provides related promotions to a customer based on the determined status of the initial promotions according to one embodiment of the present invention. Preferably, the host computer 101 is appropriately programmed with server software for delivering Web pages to remote clients or computers such as the customer computer 103 to provide online shopping services for retail store 113. The host computer 101 communicates with the customer computer 105, the hard copy delivery server 107, the electronic transaction device 109, and the retail store computer 115 using any suitable protocol for communicating directly or via the Internet 111.

The global database 103 is a file that includes records containing information for providing promotions to a customer based on the status of promotions previously delivered to the customer, in accordance with the present invention. This information includes promotion identifiers of promotions delivered to a customer, the delivery date of the promotion, the medium through which the promotion was delivered, and the status of the promotion as well as status criteria for determining the status of a promotion, and related promotions delivered based on the status of a previous promotion. Records in the global database 103 contain fields together with a set of operations for searching, sorting, recombining, and other database functions as will become further apparent below. While the global database 103 is shown as a single database in FIG. 1, the global database 103 may be implemented as two or more databases, if desired.

The global database 103 also includes information of each purchase made by the customer in retail store 113. This information is used for providing initial promotions based on customer purchase history and determining the status of promotions in accordance with the present invention, and may include, but is not limited to the shelf keeping unit (SKU), brand, size, weight, price, date and time of purchase, and customer identifier (CID) of the customer making the purchase, for example. Portions of this information are obtained from bar codes on purchase items, which are scanned by the scanner 131 during a customer transaction at the POS 123 of the retail store 113. These bar codes may contain UPC, JAN, and EAN information. One or more of U.S. Pat. Nos. 5,832,457; 5,649,114; 5,430,644; and 5,592,560 describe techniques for collecting consumer purchase history information and for storing such information in databases such as the global database 103 and the store database 117, for example. U.S. Pat. Nos. 5,832,457; 5,649,144; 5,430,644, and 5,592,560 are incorporated herein by reference. Additionally, techniques for collecting consumer purchase information and for storing such information in databases, such as the global database 103 and the store database 117, are described in other patents owned by Catalina Marketing and/or Catalina Marketing International. Each patent owned by Catalina Marketing and/or Catalina Marketing International is incorporated herein by reference.

The customer computer 105 is any computer, that one or more consumers can access, such as a home or office computer and may be implemented as the computer 1001 of FIG. 10 for example. The customer computer 105 may also be implemented as an interactive television set, wireless hand held device or other hardwired or wireless structure suitable for accessing remote computers via the Internet 111. Interactive television systems are described in U.S. Pat. Nos. 4,847,700, 5,721,583, and 5,552,735, and wireless handheld devices are described in U.S. Pat. Nos. 4,545,023, 5,133,076, and 5,900,875, for example. U.S. Pat. Nos. 4,847,700, 5,721,583, and 5,552,735, 4,545,023, 5,133,076, and 5,900,875 are incorporated herein by reference. The customer computer 105 is preferably programmed with any suitable Web browser software that permits the customer computer 105 to retrieve Web pages via the Internet 111 from remote computers or servers such as the host computer 101 in order to provide online shopping to the user of the customer computer 105. The Web browser software may also be used to transmit information provided by a consumer to remote computers such as the host computer 101. According one embodiment of the present invention, the customer computer 103 uses Internet 111 transmit customer identifier and status information to the host computer 101, and to receive initial and related promotions from the host computer 101.

The hard copy delivery server 107 is a Web server programmed to receive, store, and/or transmit information relating to hard copy promotion delivery activities and may be implemented as a general purpose computer such as the computer shown in FIG. 10. The hard copy delivery server 107 may be associated with a postal advertising center, door to door promotional flyer distribution center, or other establishment for delivering hard copies of promotions to customers. According to one embodiment, information including information for identifying consumers, promotion identifiers of hard copy promotions delivered to customers, and delivery dates and mediums of hard copy promotions are automatically or manually input into the hard copy delivery server 107 and transmitted via Internet 111 to the host computer 101 to be used in accordance with the present invention. The hard copy delivery server 107 may also receive requests or instructions relating to hard copy promotions from the host computer 101.

The electronic transaction device 109 is similarly configured as a Web server programmed to receive, store, and/or transmit various types of information, including, information for identifying consumers and status information for promotions delivered to the electronic transaction device 109 by the host computer 101. The electronic transaction device may be an automated teller machine (ATM), a pay at the pump gasoline pump, a digital photo center, or any other stand alone electronic device for transacting business with a customer. According to one embodiment, promotions are preferably transmitted from the host computer 101 to the electronic transaction device 109 during the customer's transaction at the device. The delivered promotions may be the result of or serve as the basis for providing promotions to customers based on the status of previous promotions as will be further discussed below. Moreover, the status information may be provided by the electronic transaction device 109 based on the customer printing/downloading or declining to print/download the promotion during the electronic transaction. The electronic transaction device 109 may be implemented as a general purpose computer such as the computer shown in FIG. 10.

The Internet 111 includes various networks and gateways for linking together various computer networks and computers such as host computer 101, customer computer 105, hard copy delivery server 107, and electronic transaction device 109.

The retail store 113 is generically referred to as a retail location and is a place where goods are kept for retail sale to customers. As noted above, many retail stores 113 may be connected to the host computer 101.

The retail store computer 115 may be implemented using the computer system 1001 of FIG. 10, for example, or any other suitable PC, work station, server, or device for communicating with the host computer 101, for storing and retrieving information in the store database 117, for monitoring data transmitted between the terminal 129 and the store controller 119 (i.e., transaction data), and for controlling the printers 127 and 133. According to one embodiment, information including information for identifying consumers, promotion identifiers of promotions delivered to customers through POS 123 and kiosk 125, and delivery dates and mediums of the promotions are transmitted to the host computer 101 to be used in accordance with the present invention. Moreover, the transaction data monitored by the retail store computer 115 is provided to the host computer 101 for determining the status of a promotion. The retail store computer may also deliver status information for promotions delivered to the customer at the POS 123 and kiosk 125. According to one embodiment, the status information is provided based on the customer printing/downloading or declining to print/download a promotion at the POS 123 or kiosk 125. The retail store computer 115 communicates with the host computer 101 using any suitable protocol for communicating with remote computers.

The store database 117 is a file that includes records containing information for carrying out transactions at the point of sale 123 by scanning bar codes printed on purchased items, and for providing promotions to a customer based on the status of promotions previously delivered to the customer, in accordance with the present invention. The store database 117 includes information for identifying customers as well as promotions and delivery dates and mediums of the promotions delivered to customers by way of the POS 123 and kiosk 125. The store database 117 also includes information of each purchase made by the customer in retail store 113. This information is used for providing initial promotions based on customer purchase history and for determining the status of promotions delivered to the customer. Records in the store database 117 contain fields together with a set of operations for searching, sorting, recombining, and other database functions for associating bar codes with products and their corresponding prices. Periodically (e.g., daily), sales transaction information stored in the store database 117 is retrieved by the retail store computer 115 and sent to the host computer 101, which uses the information to update the purchase history information stored in the global purchase database 103.

The store controller 119 is any computer or device for communicating with the terminal 129 and for using information stored in the store database 117 to carry out transactions at the POS 123. A description of a store controller 119 is found in U.S. Pat. No. 5,173,851, for example.

The retail store 113 includes one or more points of sale 123. Each point of sale 123 preferably includes a corresponding printer 127, a terminal 129, and a scanner 131. The printer 127 prints, for example, promotions in response to receiving commands from the retail store computer 115 and/or host computer 101. The terminal 129 may be implemented as a standard cash register and may include a screen, credit card reader, and numeric key pad, for example. The terminal 129 communicates with the store controller 119 and the scanner 131. The scanner 131 may be implemented as any conventional scanning device for reading product information such as an item code (e.g., UDC, EAN, or JAN) from bar codes or other indicia on the product. Information read by the scanner 131 is transmitted to the store controller 119 via the terminal 129. The store controller 119, uses the scanned information and the information stored in the store database 121 to determine information of the transaction including SKU, product price, quantity, and product description, for example.

If there are multiple points of sale 123 within the retail store 113, then each terminal 129 is preferably arranged on a loop with the store controller 123. The retail store computer 115 is located in front of the store controller 119 on the loop so that information transmitted from the terminal to the store controller is monitored by the retail store computer 115.

The retail store 113 also includes one or more kiosks 125. Kiosk 125 is any small structure and/or electronic unit for transacting with a customer. Each kiosk 125 includes a customer interface 137 and a printer 133. The kiosk 125 is coupled to the store database 117 via the retail store computer 115. It is to be understood that the retail store 113 is a retail store location including, for example a building or similar area for making purchase transactions as well as any parking area, walking area, resting area, or any other area associated with the area for making purchase transactions. Moreover, kiosk 125 may be located anywhere in this broad area for making purchases of retail items. According to an embodiment of the present invention, a customer inputs a CID through the customer interface 137 and receives promotions that may be printed from printer 133.

The customer interface 137 of kiosk 125 provides customer with a means for manually inputting information into kiosk 125 and may include a display for prompting the user to input information or select an option. For example, the customer interface 137 may include a keypad that allows a customer to input his or her CID and to select options from a menu displayed on a screen. Printer 133 is any one of a variety of conventionally known printing devices and may be integral to the kiosk 125 or a portable printing device coupled to the kiosk 125. It is to be understood that the kiosk 125 is an active device which includes a memory and a processor for storing and processing data related to providing promotions to a customer based on the status of previous promotions. Alternatively, however, kiosk 125 may be an interface device which transfers information to a computer system that is associated with the retail store, via a local area network (LAN), for example, and includes a memory and a processor for storing and processing data related to providing promotions to a customer based on the status of previous promotions.

It is to be understood that the system in FIG. 1 is for exemplary purposes only, as many variations of the specific hardware and software used to implement the present invention will be readily apparent to one having ordinary skill in the art. For example, the functionality of the retail store computer 115 and the host computer 101 may be combined in a single device. To implement these variations as well as other variations, a single computer (e.g., the computer system 1001 of FIG. 10) may be programmed to perform the special purpose functions of two or more of the devices shown in FIG. 1. On the other hand, two or more programmed computers may be substituted for any one of the devices shown in FIG. 1. Principles and advantages of distributed processing, such as redundancy and replication, may also be implemented as desired to increase the robustness and performance of the system, for example.

The present invention stores information relating to consumer identifications, promotion identifiers, delivery dates and mediums, and promotion statuses, for example. This information is stored in one or more memories such as a hard disk, optical disk, magneto-optical disk, and/or RAM, for example. One or more databases, such as the global database 103 and store database 117 may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 10, for example.

Figure 2C:
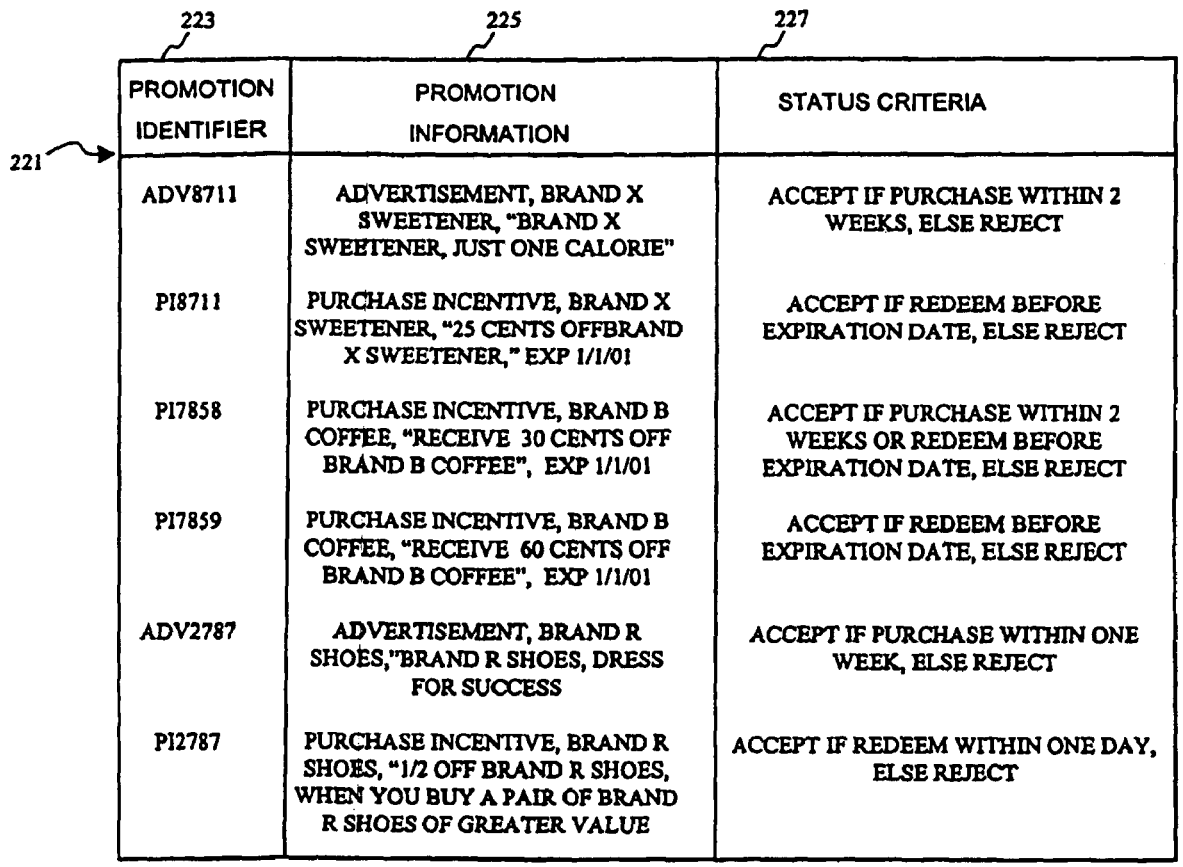
FIG. 2C is a promotions table for associating a promotion identifier with promotional information and status criteria for the promotion relating to promotion identifier in accordance with the present invention.

FIGS. 2A-2C, depict data structures used for implementing a system for providing promotions to a customer based on the status of previous promotions according to an embodiment of the present invention. The data structures are depicted in a relational format, using tables, whereby information stored in one column (i.e., field) of a table is mapped or linked to information stored in the same row (i.e., record) across the other column(s) of the table. These data structures are used by the host computer 101 and/or the retail store computer 115 to provide promotions to a customer based on the status of previous promotions.

FIG. 2A is a promotions tracking table 201 that includes a field 203 for storing customer identifiers. Each customer or consumer is provided with a CID that identifies the particular customer. A CID is any identifier that is scanned, read, or otherwise entered into a computer system to identify a customer. Each customer may have multiple CIDs. Preferably, the CID is represented as a bar code so that it can be quickly scanned at checkout by the scanner 131, although any other type of machine readable or non-machine readable implementations for storing or displaying identifications may be used, including magnetic strips, memory chips, and smart cards. Examples of possible consumer IDs are credit card numbers, debit card numbers, social security card numbers, driver's license numbers, checking account numbers, street addresses, names, e-mail addresses, telephone numbers, frequent customer card numbers, shopper card identifications (SCIDs), or shopper loyalty card numbers-issued by the retail store 113, although any other suitable form of identification may be used.

Promotion tracking table 201 also includes a field 205 for storing promotions delivered to the customer associated with the customer identifier in field 201., fields 207 and 209 for storing the delivery date and delivery medium respectively of each promotion in field 205, and a field 211 for storing the status of each promotion in field 205. As seen in FIG. 2A, fields 205, 207, 209, and 211 of the promotions tracking table 201 include multiple records associated with a single CID in field 203. The promotions of field 205 are preferably represented by a unique promotions ID number such as a bar code, and the delivery dates of field 207 are preferably represented in numerical format to reduce data to be processed and transmitted. The delivery medium in field 209 indicates the medium through which the promotion of field 205 was promotioned to the customer, and field 211 indicates the status of the promotion as will be further described below.

To illustrate the use of promotion tracking table 201, FIG. 2A includes exemplary entries for two customers. The first entry of FIG. 2A shows that field 203 contains the number "052799" as a customer identifier, and in the same record, fields 205, 207, and 209 indicate that the customer associated with CID 052799 received the promotion "ADV2787" on "Nov. 2, 2000" through the medium of the "Cust. Comp," and PI2787 on the same day through the same medium. Field 211 further reveals that ADV2787 and PI2787 have a reject and accept status respectively. The second entry of FIG. 2A shows that field 203 contains the number "090269" as a customer identifier, and in the same record, field 205 contains the entries "ADV8711", "PI8711", "PI07858", "PI7859" and "PI8200" as five promotions that have been delivered to the customer associated with the CID 090269. In field 207 of this record are the entries "Oct. 10, 2000", "Oct. 26, 2000", "Oct. 30, 2000", "Nov. 3, 2000" and "Nov. 3, 2000 as delivery dates corresponding to ADV8711, PI8711, PI7858, PI7859, and PI8200 respectively. Similarly, field 209 shows the entries "DIRECT MAIL", "CUST.COMP", "ELECT.TRANS", "KIOSK", and "POS" as the promotion medium, and field 211 indicates "REJECT", "ACCEPT", "REJECT", "ACCEPT", and "UNKNOWN" as the status of the five promotions respectively. Thus, the promotions tracking table 201 associates each customer identifier with the promotions delivered to the customer, the promotion date and medium of each promotion, and the status of each promotion. The promotions tracking table 201 is preferably stored in the global database 103 but may be stored in the store database 117 or any other suitable database.

As also seen in FIG. 2A, a promotion status entry in field 211 of the promotions tracking table 201 may include a "(H)" flag indicating that the promotion associated with the flagged status has served as the basis for determining a related promotion. The (H) flag allows records to be identified as historical records so that they will not be accessed and processed for certain processing steps of the present invention thereby improving efficiency. Moreover, the "(H)" flagged records are retained within the promotions tracking table 201 for historical analysis as will be further discussed below.

FIG. 2B is a related promotions table 213 that includes a field 215 for storing promotions, a field 217 for storing the possible statuses for each promotion in field 215, and a field 217 for storing related promotions for each status of each promotion. Fields 217 and 219 include multiple records for storing different statuses and associated related promotions for each promotion identified in field 215. Thus, as seen in the first entry of table 213, the promotion associated with the promotions identifier ADV8711 can achieve a status of "ACCEPT" or "REJECT" as indicated by field 217. Field 219 indicates that the related promotion for the accept status is "10 CENTS OFF BRAND X SWEETENER," while the promotion "25 CENTS OFF BRAND X SWEETENER" relates to the reject status for promotion ADV8711. The promotion status and related promotions for PI8711, PI7858, PI2787, and ADV2787 are also illustrated in FIG. 2B. As seen in the record of PI2787, several related promotions may be available for each status of each promotion.

FIG. 2C is a promotions table 221 that includes a field 223 for storing promotion identifiers, a field 225 for storing promotions associated with the promotions identifiers of field 223, and a field 227 for storing the status criteria associated with the promotions of field 225. As indicated above, the promotion identifier fields 205 and 217 of the promotion tracking table 201 and the related promotions table 213 respectively are preferably populated with promotions identifiers to reduce data processing and transfer times. Field 225 of the promotions table 221 includes all promotion information associated with each promotion identifier. For example, while the promotion identifier is merely an alphanumeric symbol, the promotion information associated with this alphanumeric symbol may be the type of promotion, the product related to the promotion, the text of the promotion, the expiration date of the promotion, and any other relevant information such as formatting characteristics for printing the promotion. Thus, as seen in the first entry of promotions table 221, the promotion ADV8711 is an advertisement for Brand X sweetener that reads "BRAND X SWEETENER, JUST ONE CALORIE." The Promotion promotions table 221 includes similar promotion information for PI8711, PI7858, PI7859, ADV2787 and PI2787.

The promotions table 221 also includes status criteria field 227 which stores the criteria for determining the status of the promotion delivered to the consumer if the consumer does not provide the feedback to indicate a status as will be discussed below. The status criteria preferably sets a time frame in which a promotion must be redeemed or the product related to the promotion must be purchased by the customer. For example, the first entry in field 227 of promotions table 221 reads "accept if purchase within 2 weeks, else reject" indicating the criteria for achieving an accept and reject status for promotion ADV8711. Similarly, table 221 indicates that PI7858 will achieve a status of accept if the consumer purchases the product related to the promotion within 2 weeks or redeems the promotion before its expiration date, otherwise the promotion will be rejected. As should be understood by one of ordinary skill in the art, any criteria may be set for determining a variety of statuses of promotions.

The data structures embodied by the present invention include the data structures shown in FIGS. 2A through 2C, as described above. Alternatively, any other desired manner of implementing the data structures embodied by the present invention may be equivalently implemented so that the desired functionality and corresponding practical application are achieved.

Figure 3A:
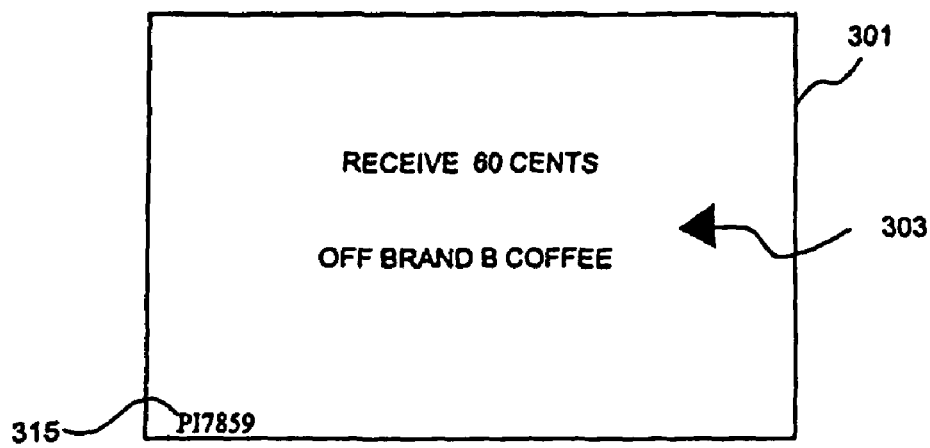
FIGS. 3A through 3C are exemplary promotions that may be delivered as initial or related promotions according to an embodiment of the present invention.
Figure 3B:
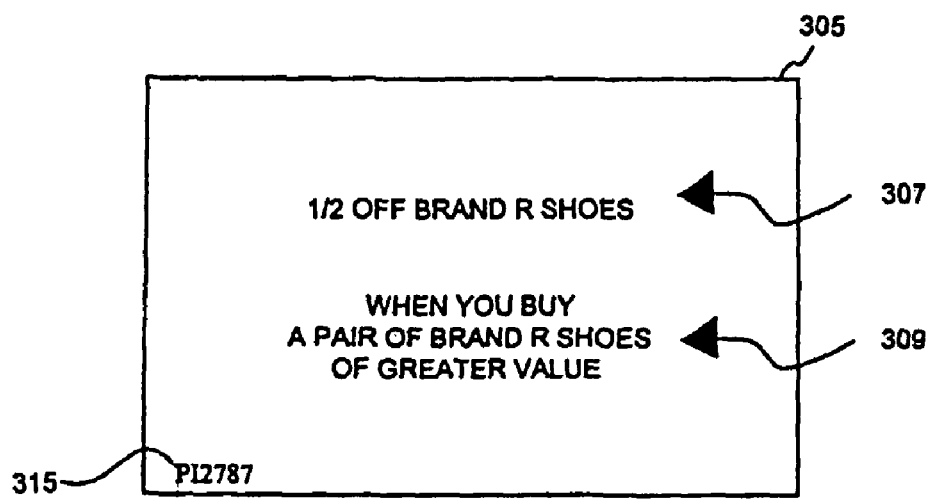
Figure 3C:
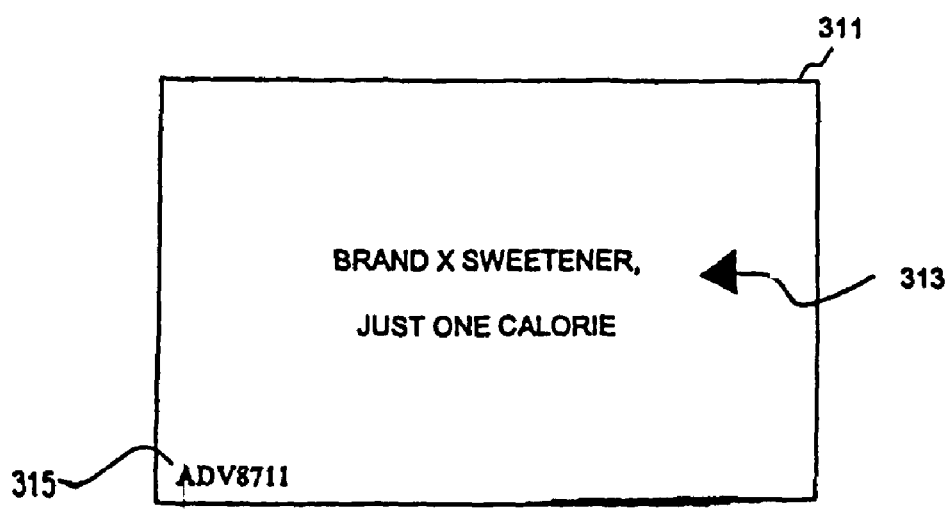

FIGS. 3A-3C are examples of promotions that may be delivered to a consumer in accordance with the present invention. As shown in FIGS. 3A and 3B, the promotions may be purchase incentives which include a reward to be received by the customer, and may or may not include a loyalty condition to be satisfied by the customer in order to receive the reward. The loyalty condition indicates what a person must do to receive the reward. The reward may be a check, coupon, discount, certificate, redeemable medium, and/or other positive benefit to a person who meets the condition. For example, purchase incentive 301 of FIG. 3A includes reward 303 (60¢ off brand B coffee) which has no loyalty condition associated with it. A customer that makes a purchase of brand B coffee at a retail store 105 that accepts the purchase incentive will receive a 60¢ discount without any further action. FIG. 3B shows a purchase incentive 305 having a reward 307 and a loyalty condition 309. The reward of "½ off brand R shoes" is given to the customer only if the condition of "buy a pair of brand R shoes of greater value" is satisfied. The purchase incentives 301 and 305 are preferably remarkable promotions designed to cause a customer to switch to a particular brand of product or to promote brand loyalty for a product. However, it is to be understood that each purchase incentive may be tailored to suit different purposes, as desired.

FIG. 3C is an exemplary advertisement 311 that may be delivered to the customer according to an embodiment of the present invention. The advertisement includes a message 313 designated to promote a particular brand and product. Thus, as seen in FIG. 3C, brand X sweetener is promoted to the consumer as being just one calorie. The advertisements are preferably accompanied by visual images of the product in an appealing manner in order to promote the product to the customer.

As seen in FIGS. 3A through 3C, each promotion preferably includes a promotion identifier located somewhere on the promotion. As indicated above, the promotion identifier allows the promotion to be processed and transmitted to remote computers in an efficient manner. The promotion identifier may be an alphanumeric number as shown in FIGS. 3A through 3C, or a bar code or other machine readable code. Also evident in FIGS. 3A through 3C is that the promotions of the present invention may promote a variety of retail products and services.

Figure 4:
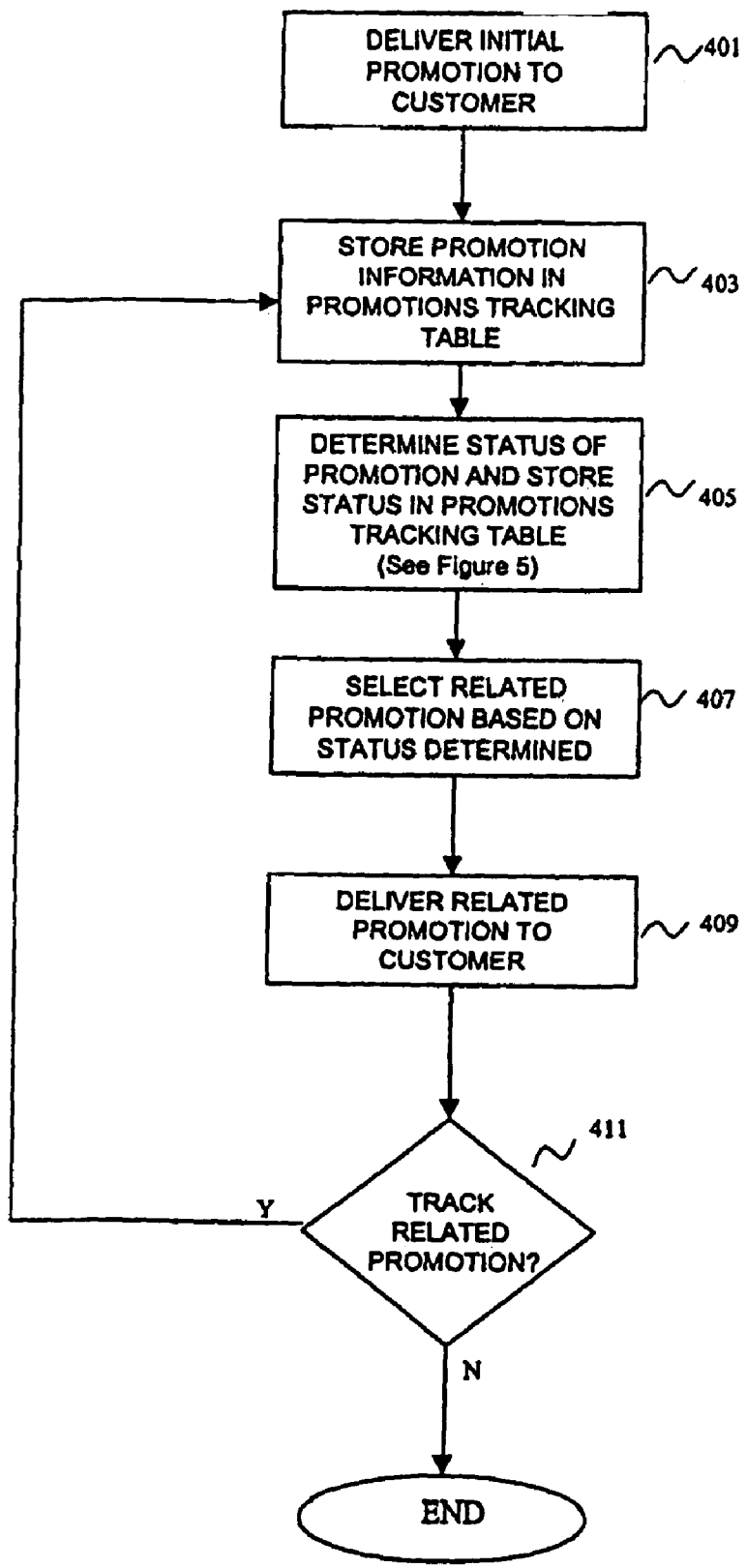
FIG. 4 is a flow chart explaining the general process for delivering related promotions to a customer based on the status of a previously delivered promotion in accordance with the present invention.

According to the present invention, an initial promotion is delivered to the consumer and a related promotion is subsequently delivered to the same customer based on the status of the initial promotion. FIG. 4 is a flow chart explaining the general process for delivering related promotions to a customer based on the status of a previously delivered promotion. In step 401, an initial promotion is delivered to a customer. The initial promotion may be delivered to the customer by any of a variety of different delivery mediums including the customer computer 105, the electronic transaction device 109, POS 123, kiosk 125, or by hard copy delivery through postal service or home delivery flyer campaigns. The initial promotion may be a standard promotion delivered to all customers, or a targeted promotion selected for a particular customer based on the purchase history of the customer. Techniques for providing targeted promotions to customers based on purchase history can be found in U.S. patent application Ser. No. 09/609,663, filed on Jul. 3, 2000, U.S. patent application Ser. No. 09/613,904, filed Jul. 11, 2000 and U.S. patent application Ser. No. 09/667,543, filed Sep. 22, 2000, which are incorporated herein by reference.

Once the initial promotion is delivered to the customer, information necessary for determining the status of the initial promotion is stored in the promotions tracking table 201 as seen in step 403. Specifically, the CID of the customer to whom the promotion was delivered, the promotion identifier, the promotion delivery date, and the promotion delivery medium are written to fields 205, 207, 209, and 211 respectively of the promotion tracking table 201. This information may be written to the promotions tracking table 201 for each promotion at the time of delivery of the promotion in step 401, or written to the promotion tracking table 201 in bulk depending on the delivery medium of the initial promotion. For example, electronic promotions delivered to the customer computer 105 or electronic transaction device 109 are transmitted from the host computer 101 to each of these devices via the Internet 111 in response to the customer inputting a CID into the device. As the information to be stored in fields 203 205, 207, and 209 of the purchase tracking table 201 is available to the host computer 101 at the time of delivery, it is preferable for the host computer 101 to write the information to the purchase tracking table 201 at the time of delivery of each promotion. On the other hand, as information relating to hard copy promotions must be input to the hard copy delivery server 107 and, therefore, is not available to the host computer 101 at the time of delivery, it is preferable to store the information in the hard copy delivery server 107 and periodically deliver the information in bulk to the host computer 101 for storage in the purchase tracking table 201 within global database 103. As for information relating to promotions delivered by POS 123 or kiosk 125, this information preferably can be transmitted to the host computer at the time of delivery of each promotion, or stored in store database 117 for periodic bulk delivery to host computer 101.

Once the initial promotion information is stored in the promotions tracking table 201, the status of the initial promotion is determined in step 405. Where the promotion is delivered to the customer via an electronic medium, the status of the promotion may be determined in near real time based on feedback from the customer. For example, where the promotion is delivered from the host computer 101 to the electronic transaction device 109 via Internet 111, the user may be asked to accept or reject the promotion by inputting a command using an input device of the electronic transaction device 109. In another embodiment, the customer feedback is provided based on the customer printing/downloading or declining to print/download the promotion. For example, if the customer prints or downloads the promotion at electronic transaction device 109, the transaction may be determined to have an "accept" status, while declining to print/download the promotion results in a "reject" status. Where the promotion is not electronically delivered, or the status is not otherwise indicated by feedback from the customer, the host computer 101 determines the status of the promotion based on status criteria and transactions relating to the product promoted by the promotion as will be discussed with respect to FIG. 5. Whether the status of the promotion is determined based on feedback from the customer or on status criteria according to FIG. 5, once determined, the host computer 101 writes the known status to field 211 of the purchase tracking table 201 within global database 103.

Once the status of the initial promotion is determined and stored to the promotions tracking table 201 in step 405, the host computer 101 selects a related promotion based on the status of the delivered promotion as seen in step 407. In selecting a related promotion for a customer, the host computer 101 first accesses the promotion tracking table 201 within global database 103 and identifies the initial promotion previously delivered to the customer in the record of field 205 associated with the customer's CID. The host computer 101 then obtains the status associated with the initial promotion from field 211 of the promotion tracking table. Once the promotion and status of the initial promotion are identified, the host computer 101 accesses the related promotions table 213 and finds the initial promotion in field 215 and the status in field 217 of this table. The host computer 101 then selects a related promotion from field 219 that corresponds to this promotion and status.

It is noted that the selection of a related promotion is preferably accomplished for each individual customer when the customer inputs a CID into the customer computer, electronic transfer device, kiosk or POS. Alternatively, however, the host computer may periodically (for example, nightly) access the purchase tracking table 201 and determine related promotions for all promotions in the promotions tracking table 201 having a known status. The related promotions are then stored in a database as promotions to be delivered to an associated customer the next time the customer interacts with the host computer 101.

With the related promotions selected, the related promotion is delivered to the customer as seen in step 409. As with delivery of the initial promotion in step 401, the related promotion may be delivered through a variety of different mediums including electronic mediums and hard copy delivery mediums. According to a preferred embodiment, once a related promotion is delivered to a customer, the initial promotion which served as the basis for the related promotion is flagged in the purchase tracking table 201. This allows the information pertaining to the initial promotion to be retained in the global database for subsequent historical analysis such as determining an effective promotion delivery medium as will be discussed with respect to FIG. 8. In one embodiment, the initial promotion is marked with an "(H)" indicating that the record is historical in nature as seen in FIG. 2A.

According to a preferred embodiment, the related promotion delivered to the customer can serve as the basis for a subsequent related promotion in the same way as the initial promotion as described above. Thus, as seen in decision block 411 of FIG. 4, the related promotion may be tracked by returning the process flow to step 403 where fields 203, 205, 207, and 209 of the promotions tracking table 201 are populated with the CID of the customer to whom the related promotion was delivered, the promotion identifier, the promotion delivery date, and the promotion delivery medium respectively of the related promotion. Subsequent steps 405, 407, and 409 are then performed on the related promotion as discussed above. As also shown by decision block 411, there is preferably a mechanism for not tracking a related promotion. This may be desirable where several different promotions for a particular product have been delivered to the customer and rejected by the customer thereby indicating that the customer is not a user of the product.

It is noted that steps 401-409 of FIG. 4 can be performed through a single medium as part of a single transaction such as an online shopping event as will be discussed with respect to FIG. 6 below, or may be performed through integration of different mediums as part of different transactions as will be discussed with respect to FIG. 7. Moreover, although the process of FIG. 4 is described with regard to a single initial promotion and a single related promotion, it is to be understood that a plurality of initial promotions may be delivered to a customer in which case steps 403-411 are performed on each promotion. For example, step 407 for selecting a related promotion may involve selecting several related promotions for a particular customer based on several previously delivered initial promotions. In this embodiment, the host computer 101 selects related promotions by accessing the promotions tracking table 201 and identifying the several previously delivered promotions associated with the CID of the customer. In this regard, the host computer 101 identifies only delivered promotions having a known status and not having been previously used to determine a related promotion (i.e. not having an (H) flag). The host computer 101 then accesses the related promotions table 213 and selects a related promotion corresponding to each previously delivered promotion identified as described above.

Figure 5:
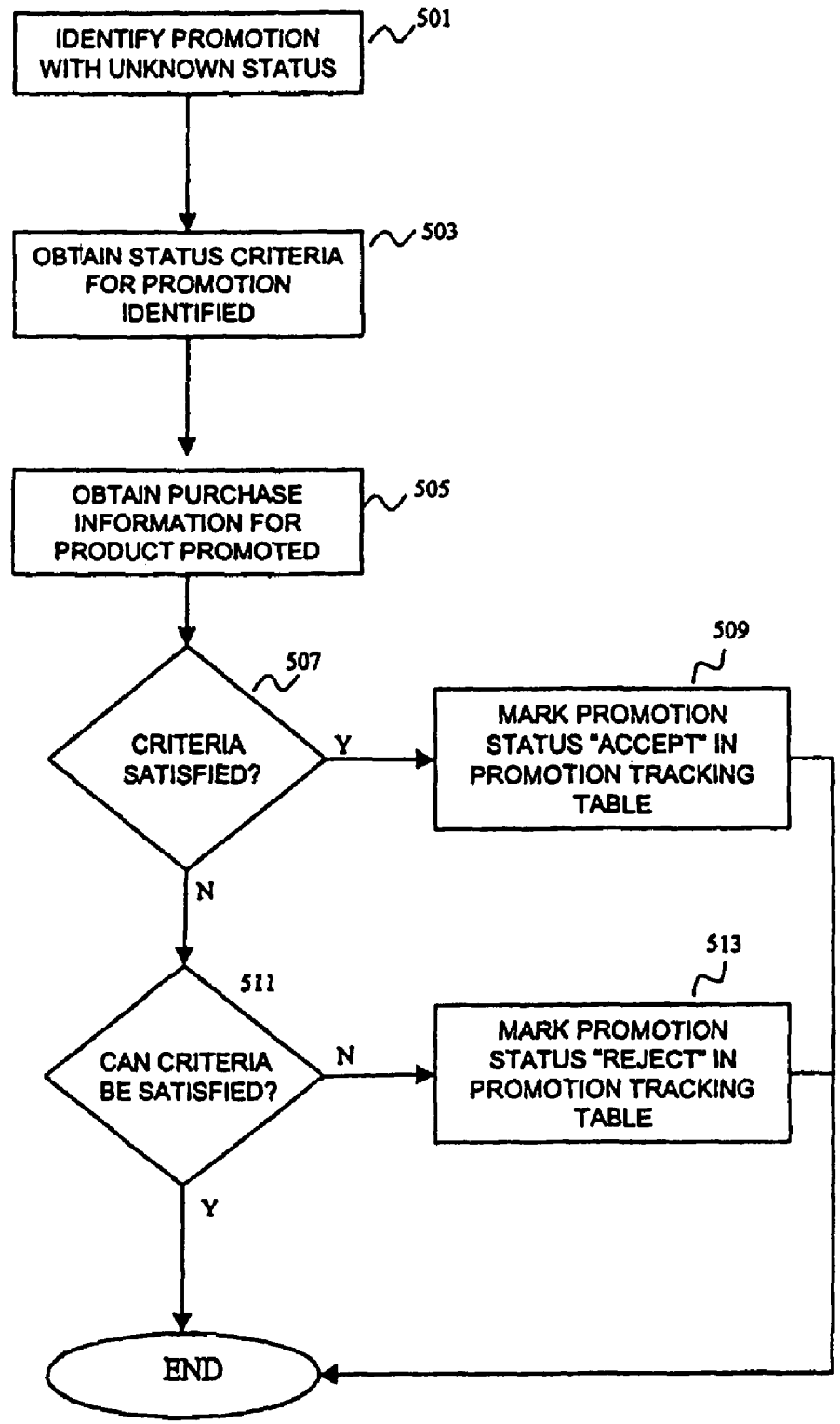
FIG. 5 is a flow chart describing a process for determining the status of a promotion according to status criteria and purchase information of the product promoted according to an embodiment of the present invention.

As mentioned above, where the status of a promotion is not indicated by feedback of the customer, the status is determined based on a predetermined status criteria assigned to the promotion. FIG. 5 is a flow chart describing a process for determining the status of a promotion according to status criteria and purchase information of the product promoted according to an embodiment of the present invention. In step 501, host computer 101 accesses the promotions tracking table 201 within the global database 103 and identifies the delivered promotion having an unknown status in field 211 of the promotions tracking table. As discussed with respect to FIG. 2C above, these promotions are identified by an "unknown" designation in field 211. In a preferred embodiment, the host computer 101 identifies promotions having an unknown status on a customer by customer basis in response to the customer transmitting his or her CID to the host computer 101 during an interaction with the host computer 101 such as a transaction at electronic transaction device 109. In another embodiment, identification of promotions having an unknown status may occur periodically for a large number of customers. More generally, it is to be understood that step 501 may involve identifying several promotions having an unknown status in which case all subsequent steps of FIG. 5 are applied to each promotion identified.

Once the promotion with an unknown status has been identified, the host computer 101 accesses the promotions table 221 and obtains the status criteria pertaining to the promotion identified as seen in step 503. As part of step 503, if the promotions identified in step 501 are identified by promotion identifier only, the promotions information is also retrieved from promotions table 221 for use in step 505 wherein the host computer 101 obtains purchase information for the product related to the identified promotion having an unknown status. As discussed with respect to FIG. 1 above, the retail store computer 115 monitors and records all purchases within retail store 113 and periodically transfers the purchase information to the global database 103 via the host computer 101. In step 505, the host computer 101 accesses this history in the global database 103 for the customer who received a promotion that has an unknown status. From the customer's history, the host computer 101 determines whether the customer purchased the product related to the promotion. The host computer 101 then applies the purchase information to the status criteria to determine the status of promotions as indicated by decision blocks 507 and 511 of FIG. 5.

According to one embodiment, the host computer determines the status of a promotion by first determining whether the accept criteria has been satisfied as seen in decision block 507. As is clear from the status criteria discussion of FIG. 2C above, the status criteria preferably sets a time frame in which the customer must redeem the promotion or purchase the product related to the promotion. Thus, as part of decision block 507, the host computer 101 obtains the date that the promotion was delivered to the customer by referring to the purchase tracking table 201, obtains the date of a purchase of the product promoted by reference to the purchase history stored for each customer in the global database 103, and determines the time frame between these two dates. The host computer then compares this time frame to the criteria time frame and, if the purchase was made within the criteria time frame, determines that the accept criteria for the promotion is satisfied and updates the promotion status field 211 of the promotion tracking table 201 with an "ACCEPT" status as seen in step 509. If the accept criteria is not satisfied, because the promoted product was not purchased or purchased too late, the host computer 101 determines whether it is still possible to satisfy the accept criteria as seen in decision block 511. In doing so, the host computer 101 obtains the date that the status is being determined by reference to an internal clock, for example, and determines the time frame between this date and the date of delivery of the promotion. The host computer 101 then makes a comparison as discussed above to determine if the criteria time frame has lapsed. If it is no longer possible to satisfy the accept criteria, because the criteria time frame has lapsed or the product was purchased too late, then the promotion status field 211 of the promotions tracking table 201 is updated with a "REJECT" status as in step 513. If the accept criteria can be satisfied, because no purchase has been made and the criteria time frame has not lapsed, then the process ends and the status of the particular promotion remains unknown until the next time the host computer 101 determines the status of promotions as discussed above. It should be understood by one of ordinary skill in the art that, while the example of FIG. 5 shows two decision blocks implementing an accept/reject criteria, any number of decision blocks may be implemented in the host computer to implement any, status criteria.

As mentioned above, the present invention may be implemented through a single medium as part of a single transaction or through different mediums as part of multiple transactions. FIG. 6 is a flow chart describing a process for providing an electronic promotion to an online customer based on the status of an initial promotion delivered to the customer at the outset of the online shopping event according to an embodiment of the present invention.

In step 601, the host computer 101 is accessed from the customer computer 105 for example. This is done by using the web browser on the customer computer 105 to locate the URL of the host computer 101. As part of the login process, the customer inputs a CID into the customer computer 105 for electronic transfer to the host computer 101 via the Internet 111. For example, if the customer associated with CID 052799 uses customer computer 105 for an online shopping event, the customer computer 105 transmits CID 052799 from customer computer 105 to host computer 101 as part of the online shopping event. The CID may be input manually, by scanning a card or other medium having the customer's CID printed thereon in bar code format, or by swiping a magnetic identification-card in a magnetic card reader connected to the customer computer 105. Still alternatively, the CID may be stored in the customer computer 105 and automatically transmitted to the host computer 101 as part of the login process.

Once the host computer 101 has received the customer's CID, the host computer 101 generates an initial promotion and electronically delivers the promotion which is received by the customer computer 105 as seen in step 603. The initial promotion may be a standard promotion transmitted to all customers who log onto the host computer shopping site, or a targeted promotion associated with the CID of the customer based on the customer's purchase history. After delivering the advertisement, the host computer 101 then writes the information relating to the advertisement to the promotions tracking table 201. Thus, continuing with the example above, as seen in the first entry of FIG. 2A, customer 052799 receives the advertisement ADV2787 "Brand R shoes, dress for success" at his customer computer 105 at the outset of his online Nov. 2, 2000 shopping event. According to a preferred embodiment, the initial promotion is delivered to the customer computer 105 prior to the commencement of the electronic shopping event. That is, the host computer 101 does not provide the customer computer 105 with access to the online shopping environment until the customer acknowledges receipt of the initial promotion. This acknowledgment may be in the form of an immediate selection of the product related to the promotion, or inputting a command into the customer computer to advance to step 605 where shopping items are selected for purchase.

The online customer then browses the shopping web site associated with retail store 113 and located on host computer 101, and selects items for purchase as indicated by step 605. While browsing, the customer is provided with details about each product and its cost. Items selected by the customer are temporarily stored by the host computer 101 and placed, for example, in a "shopping cart" where they await payment in a bulk transaction at the closing of the shopping event. When finished browsing the shopping site, the customer initiates payment for the items selected as seen in step 607. This is preferably done by simply selecting an area on a graphical user interface or otherwise transmitting a command to the host computer 101. Also, the payment initiation in step 607 prompts the host computer 101 to determine the status of the initial promotion and to transmit a related promotion to the customer computer 105 in steps 609 and 611 respectively.

Figure 6:
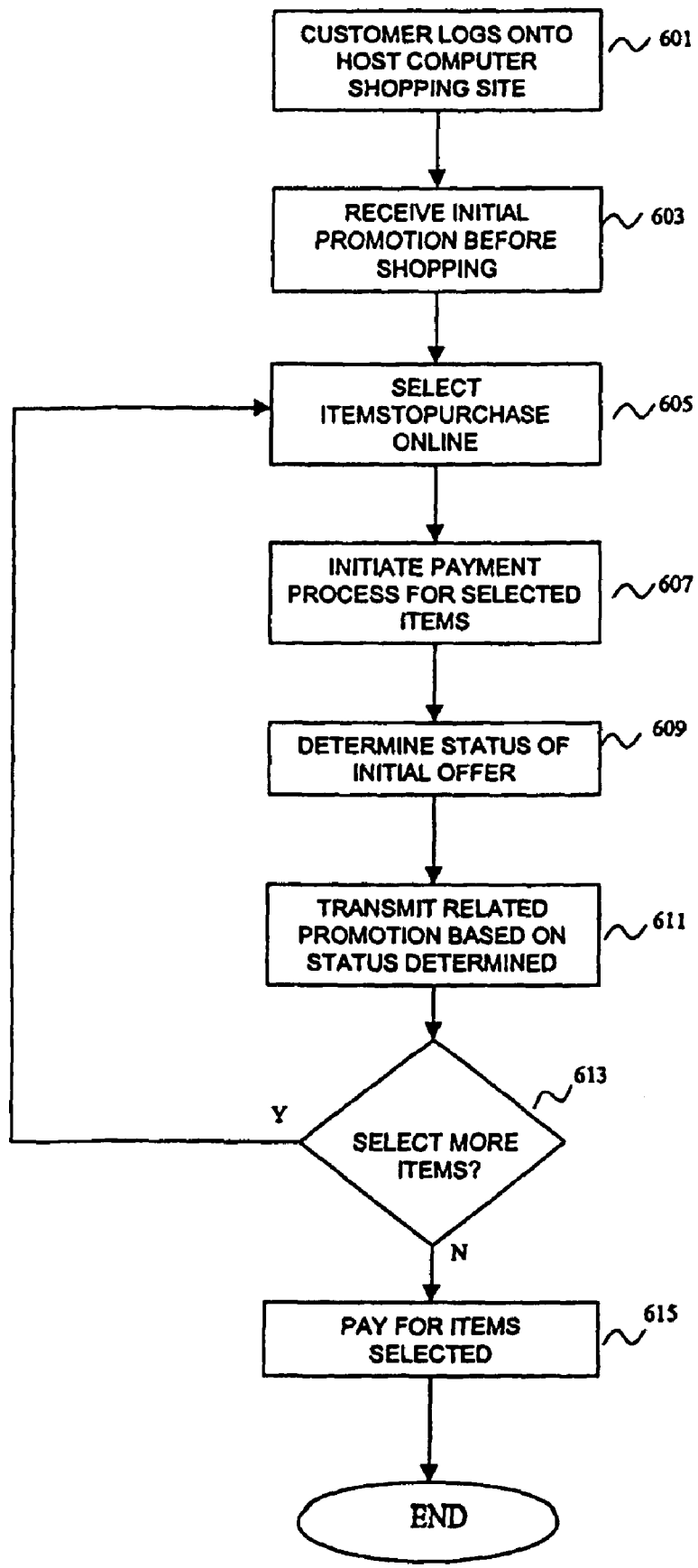
FIG. 6 is a flow chart describing a process for providing an electronic promotion to an online customer based on the status of an initial promotion delivered to the customer at the outset of the online shopping event according to an embodiment of the present invention.

According to the embodiment shown in FIG. 6, while the status of an online promotion may be determined from customer feedback as each item is placed in the shopping cart, in determining the status of the initial promotion, the host computer 101 first identifies what product is related to the promotion delivered to the customer in step 603 by referring to promotions table 221. The host computer 101 then reviews the stored items in the customer's "shopping cart" to determine whether these items include the product related to the initial promotion. If the product is located in the customer's shopping cart, the promotion related to the product is given an "accept" status because the customer intends to purchase the product. If, however, the product is not within the customer's shopping cart, the host computer assigns the promotion a "reject" status. The host computer 101 then writes the determined status to the purchase tracking table 201 as previously discussed. Thus, returning to the example of customer 052799, the first entry of the purchase tracking table 201 shows that ADV2787 has a "reject" status indicating that Brand R shoes were not placed in the customer's shopping cart.

With the status of the initial promotion known, the host computer 101 then selects and transmits a related promotion to the customer computer 105 based on the status of the initial promotion as seen in step 611. The related promotion is selected by accessing the related promotion table 213 as discussed with respect to FIG. 4 above. Where the initial promotion was accepted, the host computer 101 preferably sends another similar promotion for another product. If the initial promotion is rejected, the host computer may send another promotion that makes the product more attractive to the customer. Returning again to the above example, as customer 052799 rejected the ADV2787 advertisement for Brand R shoes, host computer 101 selects purchase incentive PI2787 for ½ off Brand R shoes as the related promotion in field 219 of related promotions table 213 and then writes the information for this promotion to the promotions tracking table 201 as seen in FIG. 2A. As also seen in FIG. 2A, ADV2787 is flagged with an "(H)" designation indicating its use in determining a related promotion.

As with the initial promotion, in a preferred embodiment, the customer must acknowledge receipt of the related promotion before completing the payment transaction. According to the embodiment of FIG. 6, the customer acknowledges receipt of the related promotion by electing to pay for the previously selected items or selecting new items in view of the related promotion being promoted as shown in decision block 613. If the customer elects to select new items, the customer inputs a command indicating this into the customer computer 105 and the host computer 101 returns the customer to step 605, where detailed information is provided for shopping items and items can again be added to the shopping cart. If, however, the customer docs not wish to return to the shopping environment, the customer can proceed to pay for the items in the shopping cart in step 615.

As mentioned above, the present invention is not restricted to providing related promotions through a single delivery medium during a single transaction such as an online shopping event. FIG. 7 is a flow chart explaining a process of integrating different delivery mediums to provide a promotion to a customer based on the status of a previously delivered promotion according to an embodiment of the present invention. To facilitate understanding of integrating different delivery mediums in accordance with the present invention, the activities of the customer associated with CID 090269 will be discussed in the description of FIG. 7. Moreover, the promotions tracking table 207 the related promotions table 213, and the promotions table 221 will also be referred to in relation to customer 090269's activities. However, it is to be understood that the use of customer 090269 in discussing FIG. 7 is illustrative only and any combination of different mediums, promotions, and criteria may be utilized in accordance with the present invention.

Figure 7:
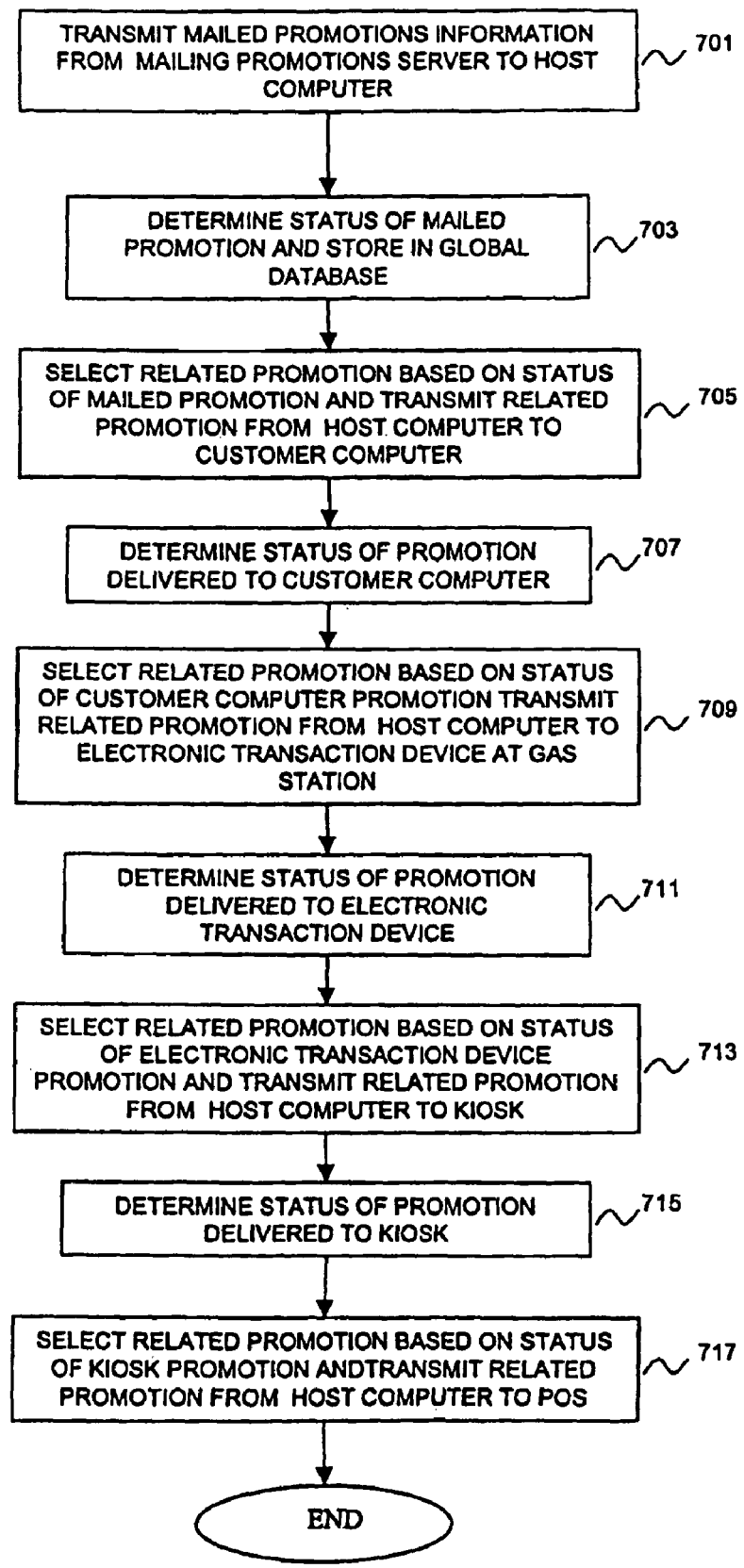
FIG. 7 is a flow chart explaining a process of integrating different delivery mediums to provide a promotion to a customer based on the status of a previously delivered promotion according to an embodiment of the present invention.

In the process indicated in FIG. 7, a promotion is first delivered to a customer by way of direct mailing and, as discussed with respect to FIG. 4 above, the information relating to the mailed promotion is input to the hard copy delivery server 107 and then transmitted to the host computer 101 for storage in the promotions tracking table 201 as indicated in step 701. For example, as seen in FIG. 2A, the second entry of purchase tracking table 201 indicates that the customer associated with CID 090269 was delivered promotion ADV8711 on Oct. 10, 2000 by way of direct mail. Reference to promotions table 221 in FIG. 2C reveals that this promotion is the advertisement "brand x sweetener, just one calorie." In step 703, the host computer 101 determines the status of the mailed promotion and stores this status in the promotions tracking table 201 as described in FIG. 5 above. Referring again to the second customer entry of the purchase tracking table 201, it is seen that ADV8711 has a "reject" status indicating that the advertisement for brand x sweetener did not persuade the customer associated with CID 090269 to purchase brand x sweetener within two weeks as set forth in the status criteria field 227 of the promotions table 221. With the status of the mailed promotion known, the host computer 101 may now send a related promotion to the customer associated with CID 090269 at a future opportunity.

In the example of FIG. 7, the next opportunity occurs when the customer uses customer computer 105 to browse the Internet, for example. Thus, as seen in step 705, the host computer 101 selects a related promotion based on the status of the mailed promotion and transmits the related promotion to the customer via Internet 111 and customer computer 105. Since mailed promotion ADV8711 was rejected by the customer, the host computer transmits purchase incentive PI8711 for "25 cents off brand X sweetener" to customer computer 105 as required by related promotions table 213. Thus, as seen in purchase tracking table 201, promotion PI8711 was delivered to customer 090269 on Oct. 26, 2000 by way of customer computer 105. Along with delivering the related promotion, host computer 101 also flags the mailed advertisement with an (H) designation. As also seen in the promotions tracking table, the status of promotion PI8711 is determined in step 707 as "accept," indicating that the customer redeemed the promotion as required by the status criteria shown in table 221.

Customer 090269 then purchases gasoline at a "pay at the pump" gas station where the customer swipes his credit card into an electronic transaction device at the pump thereby entering his CID into the device. The CID is transmitted to the host computer 101 which again accesses the related promotions table 213, and selects a related promotion based on the status of the customer computer promotion determined in step 707, and transmits the related promotion to the electronic transaction device 109 at the gas pump as seen in step 709. Because the promotion for sweetener was accepted by the customer, the host computer 101 preferably selects a related promotion for a product that is a compliment for sweetener. Thus, as seen in the promotions tracking table 201, the host computer 101 transmits PI7858 for 30 cents off brand B coffee to the electronics transaction device 107 on Oct. 30, 2000 and flags promotion PI7858 with an (H). As also seen in the promotions tracking table 201, step 711 of determining the status of the promotion delivered to the electronic transaction device results PI7858 having a "reject" status due, for example, to the customer declining to print the promotion at the electronic transaction device 107.

The customer next goes to retail store 113 and visits in store kiosk 125 where the customer inputs his CID to obtain information and promotions. Kiosk 125 transmits the CID to host computer 101 which selects a related promotion based on the promotion status determined in step 711, and transmits the related promotion to kiosk 125 as shown in step 713. Since the 30 cent coffee coupon was rejected by the customer at the gas pump, the host computer 101 now delivers PI7859 for 60 cents off brand B coffee to the customer at kiosk 125 on Nov. 3, 2000, as reflected in the promotions tracking table 201. The status of this promotion is then determined in step 715 and, as shown in the promotions tracking table, PI7859 is accepted by the customer either by immediately printing or by redeeming the purchase incentive at the POS 123 during the customer's shopping event at retail store 113. Where the promotion is redeemed by the POS 125, the promotion is either scanned or manually input to the POS 125 by a retail store cashier at the checkout counter of retail store 113. According to a preferred embodiment, this information is immediately transmitted via the retail store computer 115 to host computer 101 which updates the status of the promotion in the promotions tracking table 201 and retrieves a related promotion and transmits the related promotion back to the POS via the retail store computer 115 as indicated by step 717. Because the 60 cent coffee coupon was accepted by the customer, the promotion transferred to POS 125 by the host computer 101 is preferably for a complementary product such as non-dairy creamer. The status of this promotion remains unknown until determined by the host computer 101 as previously discussed.

Figure 8:
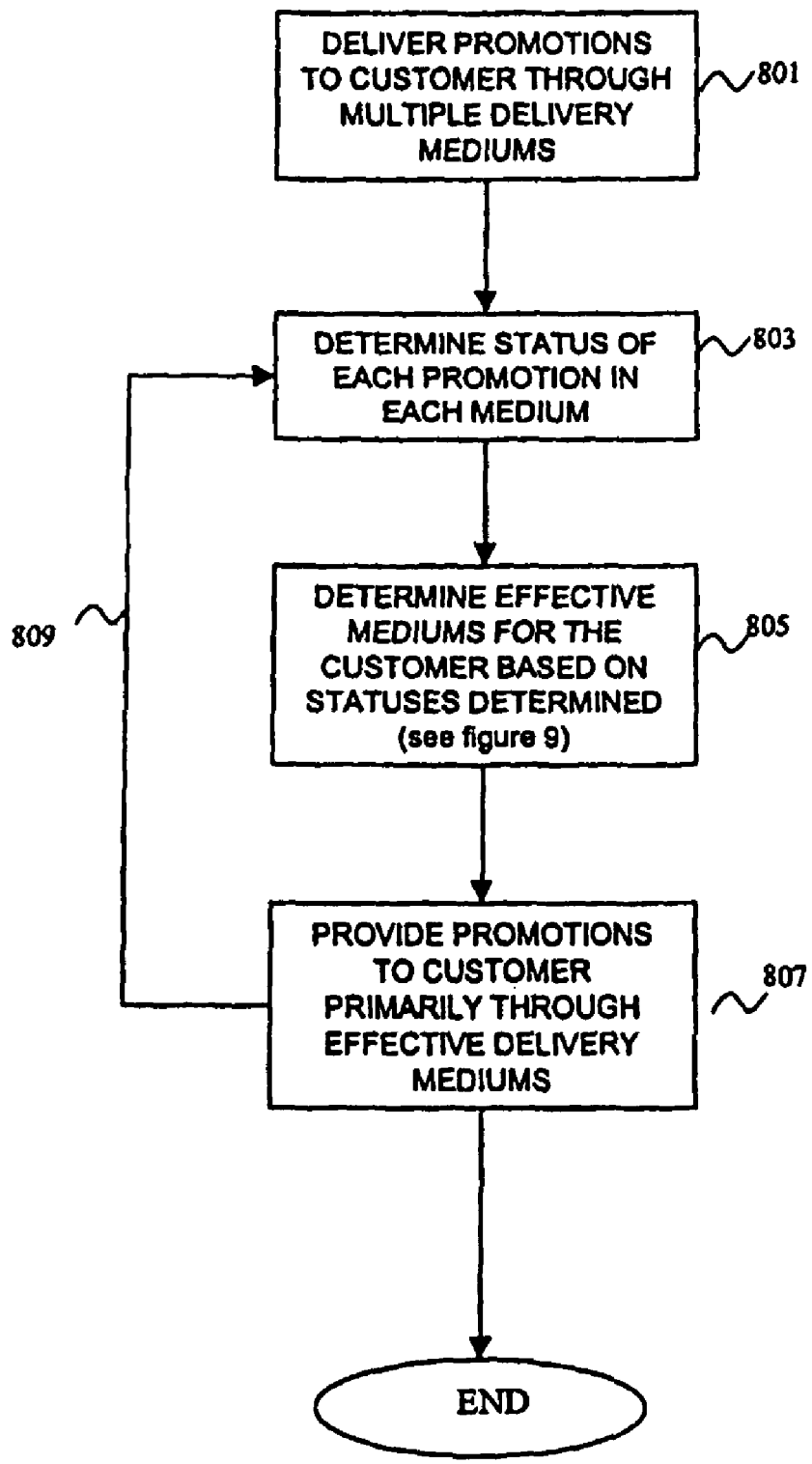
FIG. 8 is a flow chart describing the process for determining an effective delivery medium for a customer and providing promotions to the customer through the effective delivery medium according to an embodiment of the present invention.

While the example described in FIG. 7 depicts a customer that is exposed to promotional efforts through a variety of different mediums, as discussed in the background section above, a customer may be exposed to only one or a small number of promotional mediums. FIG. 8 is a flow chart describing the process for providing promotions to the customer primarily through the effective delivery mediums according to an embodiment of the present invention. In step 801, promotions are delivered to a customer through a variety of different delivery mediums including electronic delivery mediums and hard copy delivery mediums. As seen in FIG. 1, for example, a customer may receive promotions by delivery to a customer computer 105 or electronic transaction device 109 over Internet 111, or by way of POS 123 or kiosk 125. As part of step 801, the identifying information, delivery date, and delivery medium for each promotion is stored fields 205, 207, and 209 of the promotions tracking table 201 and associated with the customer's CID as discussed with respect to FIG. 4 above. The host computer 101 then determines the status of each promotion in each medium and writes the determined statuses to field 211 of the promotions tracking table 201 in step 803 as also previously described.

In step 805, host computer 101 determines an effective delivery medium for the customer based on the statuses determined in step 803. An effective delivery medium is a delivery medium that the customer generally uses to obtain promotional information for various products and services. For example, in addition to postal services, a customer may have a customer computer 105 with access to the Internet, both of which are common 111 mediums for the delivery of promotional information. However, the customer may not read direct mail promotions because he or she prefers to obtain promotional information from the Internet 111 using the customer computer 105. Thus, the customer computer 105 would be an effective delivery medium for this customer while direct mailing would not. As another example, a customer may obtain promotional information for one type of retail product, for example groceries, by direct mail, while obtaining promotional information for another type of retail product, for example clothing items, by customer computer 105. Thus, a delivery medium may be effective only for a particular type of retail product. How the host computer 101 determines the effectiveness of a delivery medium for customers will be discussed with respect to FIG. 9.

Once the effectiveness of each delivery medium has been determined, the host computer 101 provides promotions to the customer primarily through the effective mediums as seen in step 807. In the case of electronic promotions delivered by the host computer 101, the host computer 101 simply delivers these promotions to the customer through delivery mediums that have been determined to be effective. In the case of hard copy promotion delivery mediums, however, the host computer 101 may transmit a message to the hard copy delivery server 107 indicating that a particular customer should be removed from the mailing list because the customer does not ordinarily respond to direct mailing or flyer delivery promotions. In a preferred embodiment, the host computer 101 continually monitors the effectiveness of each medium. Thus, as shown by the process flow arrow 809 of FIG. 8, even after a medium is determined to be effective for the delivery of promotions, the host computer 101 may monitor the status of promotions delivered through the effective mediums and periodically update the effectiveness of the medium. In addition, the host computer 101 may periodically deliver promotions to a customer through a variety of delivery mediums as in step 801 to account for life changes of customers that also change the effectiveness of a delivery medium.

Figure 9:
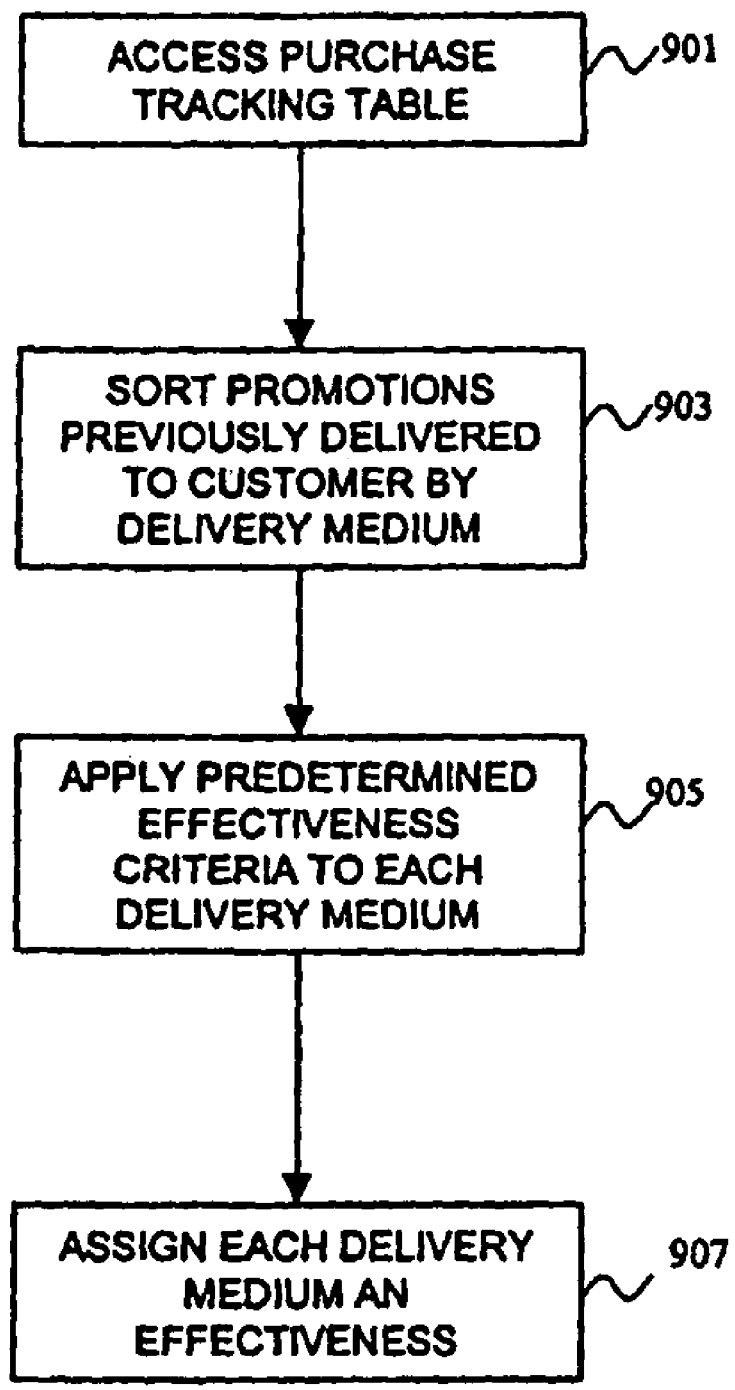
FIG. 9 is a flow chart describing the process for determining the effectiveness of a delivery medium according to an embodiment of the present invention.

FIG. 9 is a flow chart describing the process for determining the effectiveness of a delivery medium in accordance with the present invention. In step 901, the host computer 101 accesses the purchase tracking table 201 in global database 103. Although this may be done on a customer by customer basis as part of the delivery of promotions to a customer, in a preferred embodiment, the host computer 101 periodically, for example monthly, accesses the purchase tracking table 201 in order to determine and update the effectiveness of delivery mediums for all of the customer identifiers stored within the purchase tracking table 201. In this embodiment, the subsequent process steps of FIG. 9 are performed for each customer identifier in field 203 of the purchase tracking table 201.

Once the purchase tracking table 201 is accessed, the host computer 101 sorts the promotions previously delivered to the customer by delivery medium as shown by step 903. Sorting by delivery medium allows the host computer to obtain a history of the promotion statuses for each delivery medium of a particular customer.

As discussed above, the status of previously delivered promotions that served as the basis for related promotions are flagged with an (H). In a preferred embodiment, step 903 of sorting promotions by delivery medium is conducted only for (H) flagged promotions however, all promotions having a known status may be included. In step 905, the host computer 101 then applies a predetermined effectiveness criteria to the status history of each delivery medium. The predetermined effectiveness criteria provides the basis for determining whether a delivery medium has been effective in promoting products to the customer associated with the CID. According to one embodiment, the criteria may set forth that five consecutively rejected promotions delivered through the same delivery medium renders the delivery medium ineffective. If five consecutive rejections do not occur, the delivery medium is maintained as an effective medium. Thus, the predetermined effectiveness criteria may be based on the number of occurrences or the frequency of occurrence of a particular promotion status within a delivery medium.

In another embodiment, the predetermined effectiveness criteria may be based on how frequently the customer uses the delivery medium. For example, the effectiveness criteria may state that if the customer conducts a transaction at the electronic transaction device 109 less than 3 times per month, the electronic transaction device 109 is an ineffective medium. Moreover, it is to be understood that more complicated criteria for determining varying levels of effectiveness may be implemented without deviating from the principles of this invention. For example, the effectiveness criteria may be based on the delivery medium, the activity of a particular customer, the type of retail product, or any other relevant criteria. Once the criteria is applied to each delivery medium, the effectiveness of each delivery medium is stored in association with the particular customer in step 907 to complete the process of determining the effectiveness of a delivery medium for a customer.

Portions of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

FIG. 10 illustrates a computer system 1001 upon which an embodiment according to the present invention may be implemented. Computer system 1001 includes a bus 1003 or other communication mechanism for communicating information, and a processor 1005 coupled with bus 1003 for processing the information. Computer system 1001 also includes a main memory 1007, such as a random access memory (RAM) or other dynamic storage device (e.g., dynamic RAM (DRAM), static RAM (SRAM), synchronous DRAM (SDRAM), coupled to bus 1003 for storing information and instructions to be executed by processor 1005. In addition, main memory 1007 may be used for storing temporary variables or other intermediate information during execution of instructions to be executed by processor 1005. Computer system 1001 further includes a read only memory (ROM) 1009 or other static storage device (e.g., programmable ROM (PROM), erasable PROM (EPROM), and electrically erasable PROM (EEPROM) flash ROM) coupled to bus 1003 for storing static information and instructions for processor 1005. A storage device 1011, such as a magnetic disk or optical disc, is provided and coupled to bus 1003 for storing information and instructions.

The computer system 1001 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 1001 using an appropriate device bus (e.g., a small computer system interface (SCSI) bus, an enhanced integrated device electronics (IDE) bus, or an ultra-direct memory access (DMA) bus). The computer system 1001 may additionally include a compact disc reader, a compact disc reader-writer unit, or a compact disc juke box, each of which may be connected to the same device bus or another device bus.

Computer system 1001 may be coupled via bus 1003 to a display 1013, such as a cathode ray tube (CRT), for displaying information to a computer user. The display 1013 may be controlled by a display or graphics card. The computer system includes input devices, such as a keyboard 1015 and a cursor control 1017, for communicating information and command selections to processor 1005. The cursor control 1017, for example, is a mouse, a trackball, or cursor direction keys for communicating direction information and command selections to processor 1005 and for controlling cursor movement on the display 1013. In addition, a printer may provide printed listings of the data structures shown in FIGS. 2A through 2C, or any other data stored and/or generated by the computer system 1001.

The computer system 1001 performs a portion or all of the processing steps of the invention in response to processor 1005 executing one or more sequences of one or more instructions contained in a memory, such as the main memory 1007. Such instructions may be read into the main memory 1007 from another computer-readable medium, such as storage device 1011. One or more processors in a multi-processing arrangement may also be employed to execute the sequences of instructions contained in main memory 1007. In alternative embodiments, hard-wired circuitry may be used in place of or in combination with software instructions. Thus, embodiments are not limited to any specific combination of hardware circuitry and software.

As stated above, the system 1001 includes at least one computer readable medium or memory programmed according to the teachings of the invention and for containing data structures, tables, records, or other data described herein. Stored on any one or on a combination of computer readable media, the present invention includes software for controlling the computer system 1001, for driving a device or devices for implementing the invention, and for enabling the computer system 1001 to interact with a human user, e.g., a customer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 1005 for execution. A computer readable medium may take many forms, including but not limited to, non-volatile media, volatile media, and transmission media. Non-volatile media includes, for example, optical, magnetic disks, and magneto-optical disks, such as storage device 1011. Volatile media includes dynamic memory, such as main memory 1007. Transmission media includes coaxial cables, copper wire and fiber optics, including the wires that comprise bus 1003. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 1005 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 1001 may receive the data on the telephone line and use an infrared transmitter to convert the data to an infrared signal. An infrared detector coupled to bus 1003 can receive the data carried in the infrared signal and place the data on bus 1003. Bus 1003 carries the data to main memory 1007, from which processor 1005 retrieves and executes the instructions. The instructions received by main memory 1007 may optionally be stored on storage device 1011 either before or after execution by processor 1005.

Computer system 1001 also includes a communication interface 1019 coupled to bus 1003. Communication interface 1019 provides a two-way data communication coupling to a network link 1021 that is connected to a local network (e.g., LAN 1023). For example, communication interface 1019 may be a network interface card to attach to any packet switched local area network (LAN). As another example, communication interface 1019 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1019 sends and receives electrical, electromagnetic or optical signals that carry digital data streams representing various types of information.

Network link 1021 typically provides data communication through one or more networks to other data devices. For example, network link 1021 may provide a connection through LAN 1023 to a host computer 1025 or to data equipment operated by a service provider, which provides data communication services through an IP (Internet Protocol) network 1027 (e.g., the Internet 131). LAN 1023 and IP network 1027 both use electrical, electromagnetic or optical signals that carry digital data streams. The signals through the various networks and the signals on network link 1021 and through communication interface 1019, which carry the digital data to and from computer system 1001, are exemplary forms of carrier waves transporting the information. Computer system 1001 can transmit notifications and receive data, including program code, through the network(s), network link 1021 and communication interface 1019.

Obviously, numerous modifications and variations of the present invention are possible in light of the above teachings. It is therefore to be understood that within the scope of the appended claims, the invention may be practiced otherwise than as specifically described herein. For example, while the invention has been described with respect to a customer printing a promotion delivered to the customer, it is to be understood that promotions delivered in accordance with the present invention may be downloaded by the customer to a hand held device. According to this embodiment, the consumer may obtain an initial or related promotion as discussed with respect to FIG. 4 above; however, rather that printing out the promotion, the customer may download the promotion to the hand held customer computer where it can be displayed and stored for later use.

The invention claimed is:

1. A computer implemented method comprising:
   delivering a plurality of promotions to a customer through a plurality of delivery mediums, such that a first promotion of said plurality of promotions is delivered to said customer through a first delivery medium of said plurality of delivery mediums, and a second promotion of said plurality of promotions is delivered to said customer through a second delivery medium of said plurality of delivery mediums, and wherein said first delivery medium is different from said second delivery medium;
   storing, in computer memory accessible by a computer comprising a processor, at least: a first effectiveness criteria; a CID (customer identification) associated with said customer; said plurality of promotions; and for each one of said plurality of promotions, an association to said CID, a delivery medium used to deliver the corresponding one of said plurality of promotions to said customer, and a status of said corresponding one of said plurality of promotions, such that said first promotion is stored in said computer memory in association with said CID, said first delivery medium, and a first promotion status, and said second promotion is stored in said computer memory in association with said CID, said second delivery medium, and a second promotion status;
   said computer determining a first delivery medium effectiveness value, indicating effectiveness of promotions delivered to said customer using said first delivery medium, wherein said computer uses data stored in said computer memory indicating status of promotions delivered to said customer using said first delivery medium and data stored in said computer indicating said first effectiveness criteria, in determining said first delivery medium effectiveness value;
   said computer determining a second delivery medium effectiveness value, indicating effectiveness of promotions delivered to said customer using said second delivery medium, wherein said computer uses data stored in said computer memory indicating status of promotions delivered to said customer using said second delivery medium, and at least one of a data indicating a second effectiveness criteria and data stored in said computer indicating said first effectiveness criteria, in determining said second delivery medium effectiveness value;
   storing in computer memory, using said computer, said first delivery medium effectiveness value in association with said first delivery medium and said CID;
   storing in computer memory, using said computer, said second delivery medium effectiveness value in association with said second delivery medium and said CID;
   determining, using a computer, whether to deliver a subsequent promotion to said customer via said first delivery medium based upon whether said first delivery medium effectiveness value indicates that said first delivery medium is an effective medium for said customer; and
   if said first delivery medium effectiveness value indicates that said first delivery medium is not an effective medium for said customer, not delivering said subsequent promotion to said customer using said first delivery medium.

2. The method of claim 1, wherein said first delivery medium is an electronic medium.

3. The method of claim 2, wherein said first delivery medium is an electronic medium that comprises at least one of a kiosk, a point of sale (POS), an electronic transaction device, and a customer computer.

4. The method of claim 2, wherein said first delivery medium comprises the Internet.

5. The method of claim 1, wherein said first delivery medium comprises a hard copy medium.

6. The method of claim 5, wherein said delivering said plurality of promotions comprises delivering through at least one of a direct mailing and hand delivery process.

7. The method of claim 1, further comprising determining status of said first promotion delivered to said customer, wherein said determining said status comprises said computer receiving electronic feedback from said customer.

8. The method of claim 7, wherein said receiving electronic feedback from said customer comprises receiving an explicit accept or reject indication from said customer.

9. The method of claim 7, wherein said determining status of said first promotion delivered to said customer comprises, said computer determining status to be acceptance in response receipt of data indicating said customer printing or downloading data embodying said first promotion, or said computer determining status to be rejection in response to receipt of data indicating said customer declining to print or download data embodying said first promotion.

10. The method of claim 1, further comprising:
    storing in said computer memory a first promotion status criteria in association with said first promotion;
    storing in said computer memory in association with said first promotion, first promotion status determination data, said first promotion status determination data comprising at least one of the following: first promotion product purchase information of a first product promoted by said first promotion indicating whether said customer has purchased said first product; first promotion redeeming information indicating whether said customer has redeemed said first promotion; first promotion delivery date information indicating delivery date of said first promotion to said customer, and first promotion expiration date of said first promotion indicating expiration date of said first promotion; and
    said computer determining first promotion status of said first promotion by applying said first promotion status criteria to said first promotion status determination data.

11. The method of 1 wherein said computer determined that said first delivery medium was an effective medium for said first consumer, and further comprising:
    subsequent to said computer determining that said first delivery medium was an effective medium for said customer, said computer updating status of promotions delivered to said first consumer via said first delivery medium;
    then said computer determining an updated first delivery medium effectiveness value for promotions delivered to said first consumer via said first delivery medium;
    then said computer determining whether said updated first delivery medium effectiveness value meets said first effectiveness criteria; and
    if said updated first delivery medium effectiveness value indicates that said first delivery medium is no longer an effective medium for said customer, not delivering a further promotion to said customer using said first delivery medium.

12. The method of claim 1 wherein said first effectiveness criteria specifies a frequency of occurrence of a particular promotion status within said first delivery medium.

13. The method of claim 1 further comprising:
    storing, in computer memory said second effectiveness criteria; and wherein said computer uses said second effectiveness criteria, in determining said second delivery medium effectiveness value for said consumer.

14. The method of claim 13 wherein said computer memory stores first data defining a first set of delivery mediums determined to be effective for said first customer in association with said CID, and second data defining a second set of delivery mediums determined to be effective for a second customer in association with a second customer CID, wherein said first data defining said first set of delivery mediums and said second data defining said second set of set of delivery mediums are different from one another.

15. The method of claim 1 further comprising said computer determining promotion status of each one of said plurality of promotions to be one of accepted, rejected, and unknown, and storing the determined status of accepted, rejected, and unknown in said computer memory.

16. The method of claim 1, wherein said effectiveness criteria for a particular delivery medium of said plurality of delivery media comprises number of occurrences of a particular one of said determined status for those promotions of said plurality of promotions provided to said customer through said particular delivery medium.

17. The method of claim 1, wherein said effectiveness criteria for a particular delivery medium of said plurality of delivery media comprises frequency of a particular one of said determined status for those promotions of said plurality of promotions provided to said customer through said particular delivery medium.

18. A system comprising:
a plurality of delivery mediums for delivering a plurality of promotions to a customer, such that a first promotion of said plurality of promotions can be delivered to said customer through a first delivery medium of said plurality of delivery mediums, and a second promotion of said plurality of promotions can be delivered to said customer through a second delivery medium of said plurality of delivery mediums, and wherein said first delivery medium is different from said second delivery medium;
a computer comprising a processor;
computer memory accessible by said computer, said computer memory storing at least: a first effectiveness criteria; a CID (customer identification) associated with said customer; said plurality of promotions; and for each one of said plurality of promotions, an association to said CID, a delivery medium used to deliver the corresponding one of said plurality of promotions to said customer, and a status of said corresponding one of said plurality of promotions, such that said first promotion is stored in said computer memory in association with said CID, said first delivery medium, and a first promotion status, and said second promotion is stored in said computer memory in association with said CID, said second delivery medium, and a second promotion status;
said computer programmed to determine a first delivery medium effectiveness value, indicating effectiveness of promotions delivered to said customer using said first delivery medium, by using data stored in said computer memory indicating status of promotions delivered to said customer using said first delivery medium and data stored in said computer indicating said first effectiveness criteria, in determining said first delivery medium effectiveness value;
said computer programmed to determine a second delivery medium effectiveness value, indicating effectiveness of promotions delivered to said customer using said second delivery medium, wherein said computer uses data stored in said computer memory indicating status of promotions delivered to said customer using said second delivery medium, and at least one of a data indicating a second effectiveness criteria and data stored in said computer indicating said first effectiveness criteria, in determining said second delivery medium effectiveness value;
said computer programmed to store in said computer memory said first delivery medium effectiveness value in association with said first delivery medium and said CID;
said computer programmed to store in said computer memory said second delivery medium effectiveness value in association with said second delivery medium and said CID;
said computer or another computer programmed to determine whether to deliver a subsequent promotion to said customer via said first delivery medium based upon whether said first delivery medium effectiveness value indicates that said first delivery medium is an effective medium for said customer; and if said first delivery medium effectiveness value indicates that said first delivery medium is not an effective medium for said customer, not delivering said subsequent promotion to said customer using said first delivery medium.

19. The system of claim 18, wherein said processor is configured to deliver said plurality of promotions through said first delivery medium wherein said first delivery medium is an electronic medium.

20. The system of claim 19, wherein said processor is configured to deliver said plurality of promotions through said first delivery medium wherein said first delivery medium is an electronic medium that comprises at least one of a kiosk, a point of sale (POS), an electronic transaction device, and a customer computer.

21. The system of claim 19, wherein said processor is configured to deliver said plurality of promotions through said first delivery medium wherein said first delivery medium comprises the Internet.

22. The system of claim 18, wherein said processor is configured to deliver said plurality of promotions through said first delivery medium wherein said first delivery medium comprises a hard copy medium.

23. The system of claim 22, wherein said processor is configured to deliver said plurality of promotions through said first delivery medium wherein said delivering said plurality of promotions comprises delivering through at least one of a direct mailing and hand delivery process.

24. The system of claim 18, wherein said processor is configured to determine a status of said first promotion based on electronic feedback from said customer.

25. The system of claim 24, wherein said processor is configured to receive an explicit accept or reject indication from said customer.

26. The system of claim 24, wherein said processor is configured to determine status of said first promotion delivered to said customer wherein said processor is configured to determine status to be (1) acceptance in response receipt of data indicating said customer printing or downloading data embodying said first promotion, or (2) rejection in response to receipt of data indicating said customer declining to print or download data embodying said first promotion.

27. The system of claim 18, wherein said processor is configured to:
store in said computer memory a first promotion status criteria in association with said first promotion;

store in said computer memory in association with said first promotion, first promotion status determination data, said first promotion status determination data comprising at least one of the following: first promotion product purchase information of a first product promoted by said first promotion indicating whether said customer has purchased said first product; first promotion redeeming information indicating whether said customer has redeemed said first promotion; first promotion delivery date information indicating delivery date of said first promotion to said customer, and first promotion expiration date of said first promotion indicating expiration date of said first promotion; and said processor is configured to determine first promotion status of said first promotion by applying said first promotion status criteria to said first promotion status determination data.

28. The system of 18, wherein said processor is configured to determine the effectiveness of said first delivery medium for said first consumer, and further comprising:

subsequent to said processor determining that said first delivery medium was an effective medium for said customer, said processor updating status of promotions delivered to said first consumer via said first delivery medium;

then said processor determining an updated first delivery medium effectiveness value for promotions delivered to said first consumer via said first delivery medium;

then said processor determining whether said updated first delivery medium effectiveness value meets said first effectiveness criteria; and if said updated first delivery medium effectiveness value indicates that said first delivery medium is no longer an effective medium for said customer, said processor not delivering a further promotion to said customer using said first delivery medium.

29. The system of claim 18, wherein said processor is configured to determine a first delivery medium effectiveness value wherein said first effectiveness criteria specifies a frequency of occurrence of a particular promotion status within said first delivery medium.

30. The system of claim 18, wherein said processor is configured to store in said computer memory said second effectiveness criteria; and wherein said processor is configured to use said second effectiveness criteria, in determining said second delivery medium effectiveness value for said consumer.

31. The system of claim 30, wherein said processor is configured to store in said computer memory first data defining a first set of delivery mediums determined to be effective for said first customer in association with said CID, and second data defining a second set of delivery mediums determined to be effective for a second customer in association with a second customer CID, wherein said first data defining said first set of delivery mediums and said second data defining said second set of set of delivery mediums are different from one another.

32. The system of claim 18, wherein said processor is configured to determine promotion status of each one of said plurality of promotions to be one of accepted, rejected, and unknown, and store the determined status of accepted, rejected, and unknown in said computer memory.

33. The system of claim 18, wherein said processor is configured to determine a first delivery medium effectiveness value wherein said effectiveness criteria for a particular delivery medium of said plurality of delivery media comprises number of occurrences of a particular one of said determined status for those promotions of said plurality of promotions provided to said customer through said particular delivery medium.

34. The system of claim 18, wherein said processor is configured to determine a first delivery medium effectiveness value wherein said first effectiveness criteria for a particular delivery medium of said plurality of delivery media comprises frequency of a particular one of said determined status for those promotions of said plurality of promotions provided to said customer through said particular delivery medium.

* * * * *